United States Patent
Hayashi

(10) Patent No.: US 11,424,693 B2
(45) Date of Patent: Aug. 23, 2022

(54) THREE-LEVEL POWER CONVERSION DEVICE, THREE-LEVEL POWER CONVERSION DEVICE CONTROL METHOD, AND STORAGE MEDIUM

(71) Applicant: TOSHIBA MITSUBISHI-ELECTRIC INDUSTRIAL SYSTEMS CORPORATION, Chuo-ku (JP)

(72) Inventor: Makoto Hayashi, Tokyo (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 0 days.

(21) Appl. No.: 17/050,306

(22) PCT Filed: Apr. 27, 2018

(86) PCT No.: PCT/JP2018/017233
§ 371 (c)(1),
(2) Date: Oct. 23, 2020

(87) PCT Pub. No.: WO2019/207772
PCT Pub. Date: Oct. 31, 2019

(65) Prior Publication Data
US 2021/0083597 A1 Mar. 18, 2021

(51) Int. Cl.
*H02M 7/483* (2007.01)
*H02P 27/08* (2006.01)
(Continued)

(52) U.S. Cl.
CPC ......... *H02M 7/4833* (2021.05); *H02M 7/487* (2013.01); *H02M 7/4837* (2021.05);
(Continued)

(58) Field of Classification Search
CPC .. H02M 7/4833; H02M 7/4837; H02M 7/487; H02M 5/4585; H02M 7/5395; H02P 27/085; H02P 27/14
See application file for complete search history.

(56) References Cited

U.S. PATENT DOCUMENTS 5,361,196 A * 11/1994 Tanamachi ............. H02P 27/14
363/41
5,459,655 A * 10/1995 Mori ....................... H01L 23/18
363/132
(Continued)

FOREIGN PATENT DOCUMENTS

CN 104040864 A 9/2014
EP 2 713 495 A2 4/2014
(Continued)

OTHER PUBLICATIONS

Indian Office Action dated Feb. 18, 2021 in Indian Patent Application No. 202017046508, 7 pages.
(Continued)

*Primary Examiner* — Yusef A Ahmed
(74) *Attorney, Agent, or Firm* — Oblon, McClelland, Maier & Neustadt, L.L.P.

(57) ABSTRACT

A three-level power conversion device includes a three-level converter and a three-level inverter. When the voltage unbalance at a neutral point of the three levels between a + side voltage and a − side voltage is greater than or equal to a threshold value, the three-level power conversion device changes the pulse width of a gate pulse at a specific timing of a gate pulse signal for operating a switching element of the three-level converter. The three-level power conversion device performs control so that the voltage at the neutral point approaches zero.

18 Claims, 12 Drawing Sheets

(51) Int. Cl.
*H02P 27/14* (2006.01)
*H02M 7/487* (2007.01)
*H02M 7/5395* (2006.01)
*H02M 5/458* (2006.01)

(52) U.S. Cl.
CPC ............ *H02P 27/085* (2013.01); *H02P 27/14* (2013.01); *H02M 5/4585* (2013.01); *H02M 7/5395* (2013.01)

(56) References Cited

U.S. PATENT DOCUMENTS

| | | | | |
|---|---|---|---|---|
| 5,638,266 A * | 6/1997 | Horie | ............... | H02M 7/487 363/132 |
| 5,790,396 A * | 8/1998 | Miyazaki | ............. | H02M 7/487 363/96 |
| 5,892,674 A * | 4/1999 | Shimada | ............. | H02M 5/4585 363/127 |
| 5,910,892 A * | 6/1999 | Lyons | ................... | H02M 7/487 363/98 |
| 6,208,098 B1 * | 3/2001 | Kume | ................... | H02M 1/126 318/400.25 |
| 6,392,907 B1 * | 5/2002 | Ichikawa | ............. | H02M 7/487 363/98 |
| 7,274,576 B1 * | 9/2007 | Zargari | ................. | H02M 1/44 363/35 |
| 8,115,444 B2 * | 2/2012 | De | ......................... | H02P 27/08 318/801 |
| 9,287,797 B2 * | 3/2016 | Hasegawa | ........... | H02M 5/4585 |
| 9,293,985 B2 * | 3/2016 | Nguyen | ................. | H02M 7/219 |
| 10,516,365 B1 * | 12/2019 | Serban | ................. | H02M 7/537 |
| 10,587,203 B2 * | 3/2020 | Nishimura | .............. | H02M 1/32 |
| 2003/0026118 A1 * | 2/2003 | Ikimi | ..................... | H02M 7/487 363/132 |
| 2003/0053324 A1 * | 3/2003 | Yamamoto | .......... | H02M 1/4216 363/127 |
| 2006/0215425 A1 * | 9/2006 | Fu | ......................... | H02M 7/219 363/37 |
| 2007/0121354 A1 * | 5/2007 | Jones | ..................... | H02P 9/102 363/47 |
| 2008/0291708 A1 * | 11/2008 | Teichmann | ............ | H02M 7/487 363/50 |
| 2010/0244798 A1 * | 9/2010 | Nakatomi | ............. | H02M 3/158 323/282 |
| 2011/0007531 A1 * | 1/2011 | Sakakibara | ............. | H02M 1/36 363/37 |
| 2011/0051478 A1 * | 3/2011 | Sato | .................... | H02M 5/4585 363/123 |
| 2011/0127837 A1 * | 6/2011 | Sato | ........................ | H02J 9/062 307/66 |
| 2011/0134672 A1 * | 6/2011 | Sato | .................... | H02M 5/4585 363/126 |
| 2011/0170322 A1 * | 7/2011 | Sato | ........................ | H02J 9/062 363/40 |
| 2013/0128631 A1 * | 5/2013 | Yang | ........................ | H02J 3/36 363/35 |
| 2013/0128632 A1 * | 5/2013 | Yang | ........................ | H02M 7/487 363/37 |
| 2015/0002066 A1 * | 1/2015 | Oda | ....................... | H02M 7/487 318/500 |
| 2015/0016155 A1 * | 1/2015 | Lee | ......................... | H02M 1/12 363/44 |
| 2016/0268951 A1 * | 9/2016 | Cho | .................... | H02M 7/483 |
| 2018/0062537 A1 * | 3/2018 | Wang | ................... | H02J 3/383 |
| 2018/0091037 A1 * | 3/2018 | Zhao | ................... | H02M 5/4585 |
| 2019/0305695 A1 * | 10/2019 | Lung | ................... | H02M 7/5395 |
| 2020/0067417 A1 * | 2/2020 | Toyoda | ................. | H02J 9/062 |
| 2020/0235655 A1 * | 7/2020 | Hayashi | .............. | H02M 1/4216 |
| 2020/0336077 A1 * | 10/2020 | Nishimura | ............. | H02M 5/458 |
| 2021/0036632 A1 * | 2/2021 | Hayashi | .............. | H02M 3/158 |
| 2021/0078415 A1 * | 3/2021 | Ohata | ................... | H02M 7/487 |
| 2021/0249966 A1 * | 8/2021 | Tobayashi | ............... | H02P 27/08 |

FOREIGN PATENT DOCUMENTS

| | | |
|---|---|---|
| JP | 2002-78346 A | 3/2002 |
| JP | 2007-282484 A | 10/2007 |

OTHER PUBLICATIONS

International Search Report dated Jun. 12, 2018 in PCT/JP2018/017233 filed Apr. 27, 2018.

* cited by examiner

THREE-LEVEL POWER CONVERSION DEVICE, THREE-LEVEL POWER CONVERSION DEVICE CONTROL METHOD, AND STORAGE MEDIUM

TECHNICAL FIELD

Embodiments of the present invention relate to a three-level power conversion device, a control method of the three-level power conversion device, and a storage medium.

BACKGROUND ART

A neutral point clamped (NPC) type three-level power conversion device is known as one of power conversion devices for converting power between alternating current (AC) power and direct current (DC) power.

In this three-level power conversion device, harmonics of a basic output of an AC side are reduced by electrically connecting a pair of capacitors corresponding to a positive side potential and a negative side potential in series to DC output terminals and setting potentials of AC terminals to three levels including a positive level, a negative level, and a zero level (neutral point potential). A process of applying gate pulse signals generated from fixed pulse patterns when a three-level converter included in such a three-level conversion device is controlled is known (e.g., Patent Document 1).

PRIOR ART DOCUMENT

Patent Document

Patent Document 1: Japanese Unexamined Patent Application, First Publication No. 2002-78346

SUMMARY OF INVENTION

Problems to be Solved by the Invention

In such a three-level power conversion device, the voltages of the pair of capacitors may be unbalanced depending on, for example, the state of an AC power supply on an input side.

A problem to be solved by the present invention is to provide a three-level power conversion device, a control method of the three-level power conversion device, and a storage medium capable of performing unbalance suppression control on the voltages of a pair of capacitors.

Means for Solving the Problems

A three-level power conversion device according to an embodiment includes a three-level converter, a first capacitor, a second capacitor, and a control unit. The control unit causes a switching element of the three-level converter to be operated using a fixed pulse pattern. The control unit controls a pulse width of at least one gate pulse included in the fixed pulse pattern and controls charging and discharging of the first capacitor and the second capacitor when a voltage difference between a charging voltage of the first capacitor and a charging voltage of the second capacitor is greater than or equal to a threshold value that has been set in advance.

MODES FOR CARRYING OUT THE INVENTION

Figure 1:
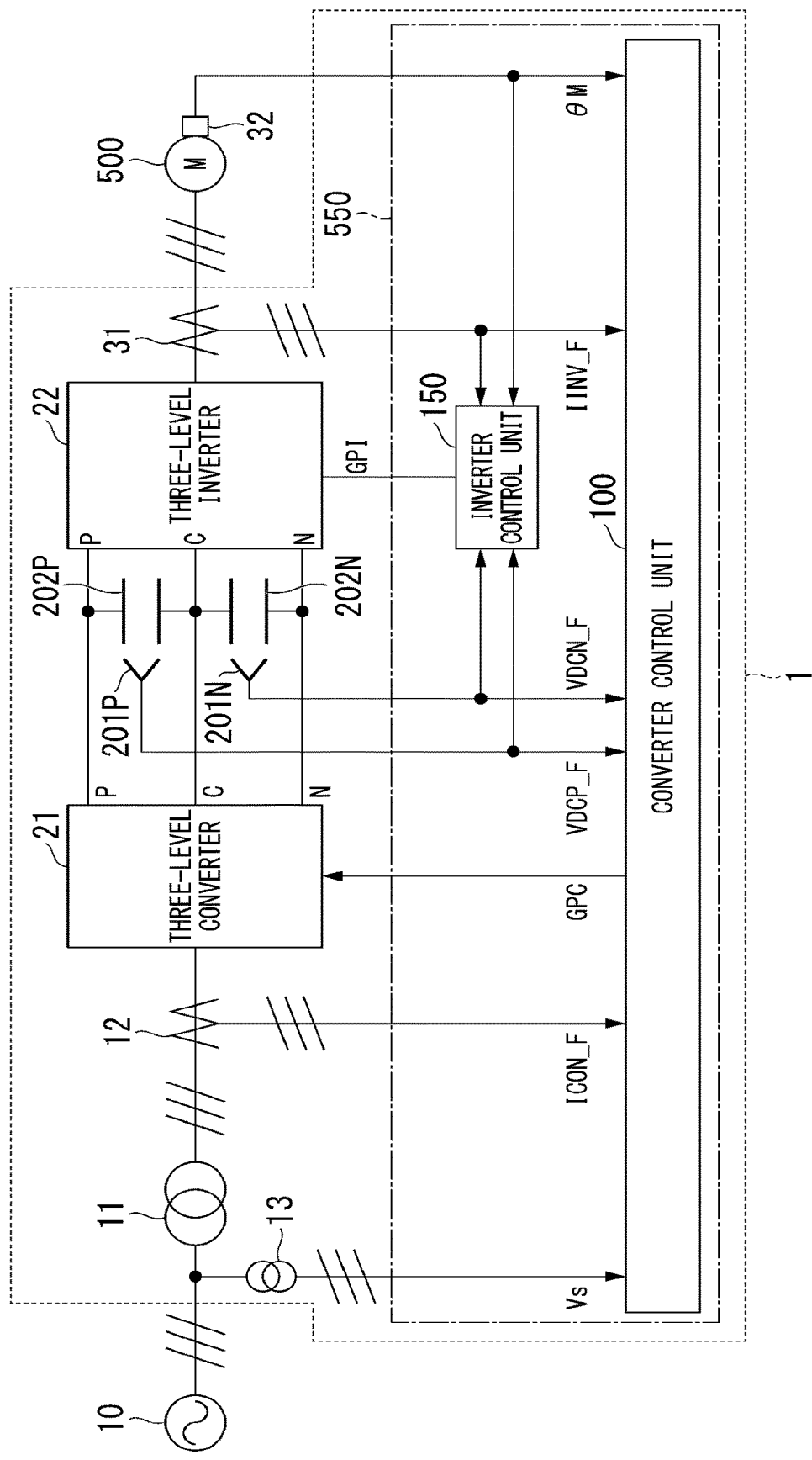
FIG. 1 is a diagram showing an example of a configuration of a three-level power conversion device according to an embodiment.

Hereinafter, a three-level power conversion device 1 according to an embodiment will be described with reference to the drawings. It should be noted that, in the following description, components having the same or similar functions will be denoted by the same reference signs and redundant descriptions of those components may be omitted. In the drawings referred to below, the illustration of gate wirings for controlling switching elements and the like is omitted for convenience of description.

FIG. 1 is a diagram showing an example of a configuration of the three-level power conversion device 1 according to the embodiment. In the embodiment, the three-level power conversion device 1 includes a transformer 11, an input current detector 12, a power supply voltage detector 13, a three-level converter 21, a three-level inverter 22, an output current detector 31, a converter control unit 100, an inverter control unit 150, DC voltage measuring instruments 201P and 201N, and capacitors 202P and 202N. The capacitor 202P is an example of a "first capacitor." The capacitor 202N is an example of a "second capacitor." In the embodiment, a control unit 550 is implemented by combining the converter control unit 100 and the inverter control unit 150. It should be noted that the capacitors 202P and 202N have, for example, the same capacitance. For example, each of the capacitors 202P and 202N may have a plurality of capacitors.

The three-level power conversion device 1 includes the capacitors 202P and 202N, which are electrically connected in series between a power supply terminal (a positive electrode terminal P) of a positive electrode voltage and a power supply terminal (a negative electrode terminal N) of a negative electrode voltage on the DC side of the three-level converter 21. The three-level power conversion device 1 converts input AC power into three-level DC power of a positive electrode voltage/zero (neutral point voltage)/negative electrode voltage and generates an AC voltage from the converted DC power. Thus, the three-level power conversion device 1 can supply power having an AC waveform in which superimposed harmonics are reduced.

More specifically, the transformer 11 transforms the AC voltage supplied from a three-phase AC power supply 10 into a predetermined voltage. An AC voltage having a predetermined voltage value is fed from the three-phase AC power supply 10 to the three-level converter 21 via the transformer 11. The three-level converter 21 is an NPC-type power conversion circuit and has the positive electrode terminal P, to which the positive electrode voltage is applied, the negative electrode terminal N, to which the negative electrode voltage is applied, and a neutral point terminal C, to which a neutral point voltage is applied. The three-level converter 21 converts the AC voltage supplied from the transformer 11 into a predetermined positive electrode voltage with respect to the voltage of the neutral point terminal C, which is a reference, and outputs the positive electrode voltage from the positive electrode terminal P to a first end of the capacitors 202P and the three-level inverter 22. The three-level converter 21 converts the AC voltage supplied from the transformer 11 into a predetermined negative electrode voltage with respect to the voltage of the neutral point terminal C, which is a reference, and outputs the negative electrode voltage from the negative electrode terminal N to a first end of the capacitors 202N and the three-level inverter 22. That is, the three-level converter 21 supplies power in which voltage is smoothed by the capacitor 202P and the capacitor 202N to the three-level inverter 22. The capacitor 202P and the capacitor 202N smooth DC voltages (charging voltages) of a positive side (P) and a negative side (N) generated by the three-level converter 21, respectively. In the following description, the positive side, to which a voltage higher than that of the neutral point terminal C is applied, may be denoted by P and the negative side, to which a voltage lower than that of the neutral point terminal C is applied, may be denoted by N using the voltage of the neutral point terminal C as a reference.

Here, a second end of the capacitor 202P and a second end of the capacitor 202N are electrically connected to the neutral point terminal C. For example, the capacitor 202P is electrically connected between the positive electrode terminal P and the neutral point terminal C. The capacitor 202N is electrically connected between the neutral point terminal C and the negative electrode terminal N. It should be noted that, in the embodiment, the direction of a flow from the three-phase AC power supply 10 to the three-level converter 21 is defined to be positive with respect to the polarity of the AC current flowing between the three-phase AC power supply 10 and the three-level converter 21.

The three-level inverter 22 is an NPC-type power conversion circuit. The three-level inverter 22 has a positive electrode terminal P, a negative electrode terminal N, and a neutral point terminal C. The positive electrode terminal P of the three-level inverter 22 is electrically connected to the positive electrode terminal P of the three-level converter 21. The negative electrode terminal N of the three-level inverter 22 is electrically connected to the negative electrode terminal N of the three-level converter 21. The neutral point terminal C of the three-level inverter 22 is electrically connected to the neutral point terminal C of the three-level converter 21.

For example, the three-level inverter 22 converts a DC voltage applied to each of the capacitors 202P and 202N into a three-phase AC voltage and supplies AC power of the converted AC voltage to a load. The three-level inverter 22 rotationally drives a three-phase AC motor 500, which is an example of the load, with the AC power. ON/OFF of switching elements provided in the three-level inverter 22 is controlled in accordance with gate signals GPI supplied from the inverter control unit 150, and the three-level inverter 22 generates a three-level AC voltage for driving the three-phase AC motor 500 from the DC voltage. For example, a rotation angle detector 32 is provided in the three-phase AC motor 500 and outputs a rotor rotation angle θM, which is the rotation angle of a rotor of the three-phase AC motor 500, to the converter control unit 100 and the inverter control unit 150.

The DC voltage measuring instrument 201P measures a voltage across the capacitor 202P and outputs a measurement result as a P-side DC voltage VDCP_F to the converter control unit 100 and the inverter control unit 150. The DC voltage measuring instrument 201N measures a voltage across the capacitor 202N and outputs a measurement result as an N-side DC voltage VDCN_F to the converter control unit 100 and the inverter control unit 150. The input current detector 12 measures a current input to the three-level converter 21 and outputs a measurement result as a converter input current ICON_F to the converter control unit 100. The output current detector 31 measures an AC current supplied from the three-level inverter 22 to the three-phase AC motor 500, which is an example of the load, and outputs a measurement result as an inverter output current IINV_F to the converter control unit 100 and the inverter control unit 150. The power supply voltage detector 13 transforms an AC voltage of at least one phase or a line-to-line voltage between a pair of phases supplied from the three-phase AC power supply 10 into a voltage of a predetermined transformation ratio and supplies the transformed voltage as an AC voltage Vs to the converter control unit 100.

The inverter control unit 150 controls the three-level inverter 22 on the basis of at least the rotor rotation angle θM and adjusts the output current IINV_F, which flows through the three-phase AC motor 500. The inverter control unit 150 may perform control so that three-level inverter 22 causes the output current IINV_F determined by a target rotational speed (not shown) supplied from the outside of the three-phase AC motor 500 to flow.

Here, the three-level inverter 22 rotationally drives the three-phase AC motor 500, which is an example of the load, in accordance with the gate signals GPI, which are supplied from the inverter control unit 150 and correspond to the P-side DC voltage VDCP_F, the N-side DC voltage VDCN_F, the inverter output current IINV_F, the rotor rotation angle θM, and the like.

In the above-described case, the inverter control unit 150 adjusts the output current IINV_F using the P-side DC voltage VDCP_F, the N-side DC voltage VDCN_F, the converter input current ICON_F, and the inverter output current IINV_F in addition to the rotor rotation angle θM. A general technique may be applied as a control method of the three-level inverter 22 using the inverter control unit 150. Also, although the three-level inverter 22 often performs control so as to suppress the unbalance between the voltages of the capacitors, the unbalance control sometimes cannot be performed if the magnitude of the output current IINV_F becomes lower than a level at which the unbalance suppression control can be performed on the three-level inverter 22 side when, for example, a mechanical load applied to the three-phase AC motor 500 is relatively light and a rotational speed of the three-phase AC motor 500 is reduced to a predetermined value or less.

The three-level converter 21 according to the embodiment generates gate pulse signals GPC in accordance with fixed pulse patterns for switching elements. Frequency components of the AC current flowing through the three-level converter 21 include harmonic components with respect to an AC reference frequency. It is desirable that the harmonic components be small. To achieve this, for example, it is preferable to adjust the gate pulse signals GPC supplied to the three-level converter 21 in advance so that the harmonic components of the AC current flowing through the three-level converter 21 are reduced. The gate pulse signals GPC in such a case may have fixed pulse patterns determined as will be described below. A fixed pulse pattern includes, as a pulse train, a plurality of pulses determined in advance so that the harmonic components of the AC current flowing through the three-level converter 21 are reduced. For example, such a pulse train may be determined as a pattern for modulating and controlling the current value of the AC current in accordance with pulse width modulation (PWM). In the pulse train that is periodically repeated as the fixed pulse pattern, the number of pulses within the pulse train, the order of pulses having different pulse widths, the position (the phase) of a pulse in a cycle, and the like may be determined in advance. In the fixed pulse pattern in the following description, at least one of the number of pulses in the pulse train, the order of pulses having different pulse widths, and the position (the phase) of a pulse in the cycle is assumed to be fixed.

The converter control unit 100 determines timings of fixed pulse patterns for controlling ON/OFF of the switching elements on the basis of each of the supplied AC voltage Vs, the converter input current ICON_F, the P-side DC voltage VDCP_F, the N-side DC voltage VDCN_F, the inverter output current IINV_F, and the rotor rotation angle θM and outputs the gate pulse signals GPC for controlling the three-level converter 21 with the fixed pulse patterns of which timings are determined to the three-level converter 21. ON/OFF of the switching elements provided in the three-level converter 21 are controlled by the gate pulse signals GPC.

Incidentally, an unbalanced state in which there is a difference between the magnitude (an absolute value) of the charging voltage of the P-side DC voltage VDCP_F and the magnitude (an absolute value) of the charging voltage of the N-side DC voltage VDCN_F may arise. The converter control unit 100 according to the embodiment controls the three-level converter 21 so that the difference between the magnitudes (the absolute values) of the voltages is reduced in order to eliminate the above-described unbalanced state. Hereinafter, the control for eliminating the above-described unbalanced state will be referred to as unbalance suppression control. When the above-described unbalanced state occurs, the potential of the neutral point does not become a middle potential between the potential of the positive electrode terminal P and the potential of the negative electrode terminal N of the three-level converter 21. That is, the above-described unbalanced state is a state in which the charging voltage of the P-side DC voltage VDCP_F and the charging voltage of the N-side DC voltage VDCN_F are different.

For example, when a fixed pulse pattern is generated, the converter control unit 100 generates a gate pulse signal GPC by determining at least one pulse (hereinafter referred to as a specific pulse) included in the fixed pulse pattern as a target pulse and adjusting the pulse width of the specific pulse. The converter control unit 100 controls the pulse width of the specific pulse. In the embodiment, the specific pulse is, for example, a pulse of the widest width (hereinafter referred to as the longest pulse width) among a plurality of pulses in the fixed pulse pattern. In the present embodiment, a target gate pulse signal in which the pulse width of the specific pulse is controlled is a specific gate pulse signal. For example, specific gate pulse signals GPC are gate pulse signals GPC1 and GPC2 supplied to the gates of switching elements SW1 and SW4 for controlling the lengths of charging and discharging periods of the capacitors 202P and 202N among the gate pulse signals GPC generated from the fixed pulse patterns for the gates of the switching elements SW1 to SW4. Also, the specific pulse is a pulse having the maximum conduction width, which is a pulse having the maximal conduction width in which each of the switching elements SW1 and SW4 is turned on, among the pulses of the specific gate pulse signals GPC1 and GPC2. For example, the converter control unit 100 may perform control for reducing the pulse width of a specific pulse so that the conduction width of the first switching element SW1 or the conduction width of the fourth switching element SW4 is reduced when a predetermined condition is satisfied. The detailed method thereof will be described below.

Figure 2:
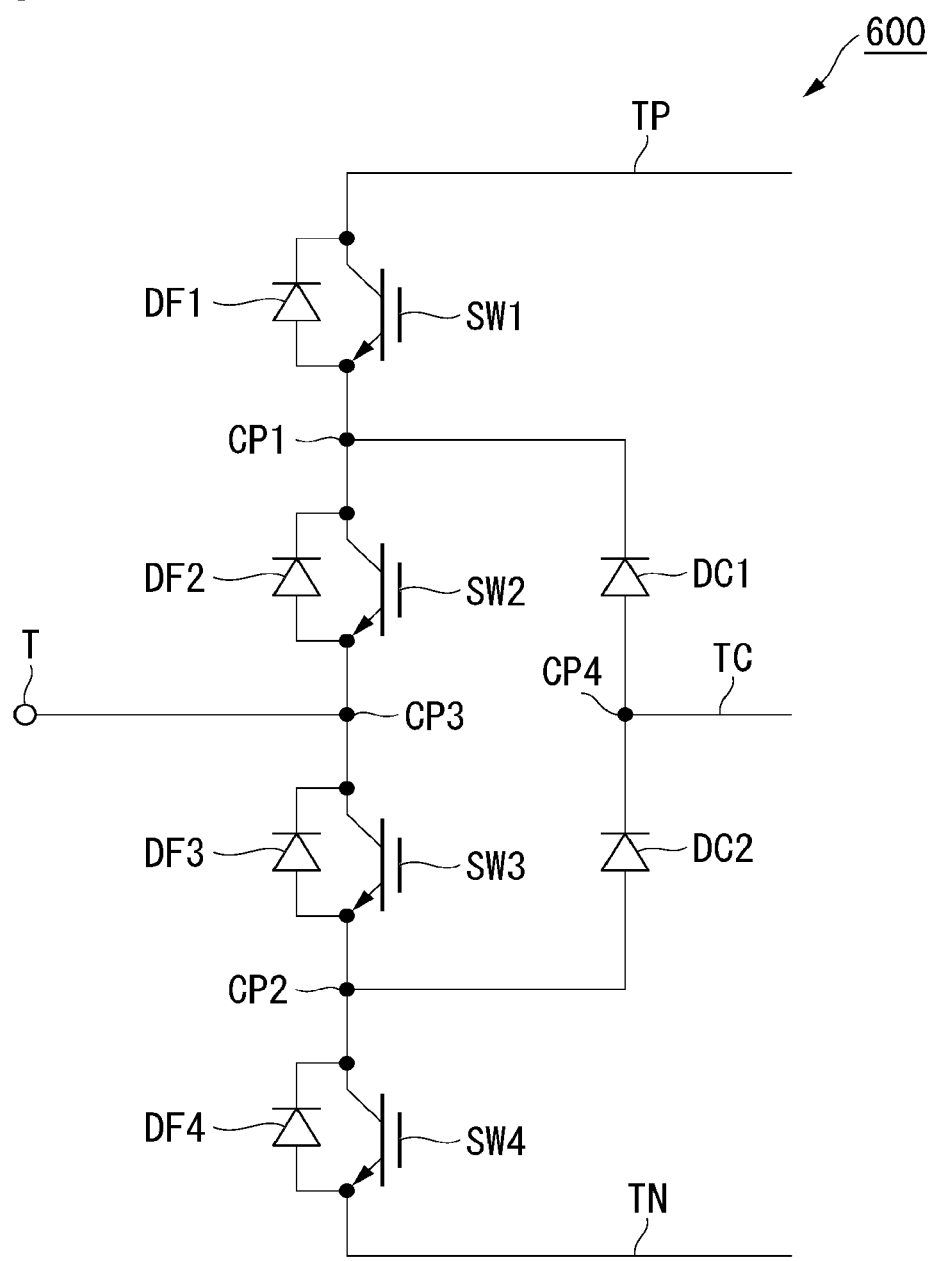
FIG. 2 is a diagram showing an example of a configuration for one phase of a three-level converter included in the three-level power conversion device according to the embodiment.

Next, a configuration of the three-level converter 21 will be described. FIG. 2 is a diagram showing an example of a configuration for one phase of the three-level converter 21 included in the three-level power conversion device 1 according to the embodiment. The three-level converter 21 includes a leg 600 for each phase on a secondary side of the transformer 11 and gate pulse signals GPC of fixed pulse patterns are supplied from the converter control unit 100 to the leg 600 for each phase. Although an example of a configuration of the leg for one phase of the three-level converter 21 is shown in FIG. 2, configurations of legs 600 for the other two phases are similar to the configuration of the leg 600 of the above-described phase.

The leg 600 includes, for example, first to fourth switching elements SW1, SW2, SW3, and SW4, first to fourth freewheeling diodes DF1, DF2, DF3, and DF4, and first and second clamp diodes DC1 and DC2. The leg 600 includes a positive electrode potential portion TP electrically connected to the positive electrode terminal P of the three-level converter 21, a neutral point potential portion TC electrically connected to the neutral point terminal C of the three-level converter 21, and a negative electrode potential portion TN electrically connected to the negative electrode terminal N of the three-level converter 21.

First, the first to fourth switching elements SW1, SW2, SW3, and SW4 will be described. Each of the first to fourth switching elements SW1, SW2, SW3, and SW4 is, for example, a transistor-type switching element having self-turn-off capability. In the embodiment, each of the first to fourth switching elements SW1, SW2, SW3, and SW4 is an insulated gate bipolar transistor (IGBT). The gate pulse signal GPC having the fixed pulse pattern described above is supplied from the converter control unit 100 to the gate of each of the first to fourth switching elements SW1, SW2, SW3, and SW4. However, each of the first to fourth switching elements SW1, SW2, SW3, and SW4 is not limited to the above example. The first to fourth switching elements SW1, SW2, SW3 and SW4 may be any elements as long as they are switching elements capable of implementing the three-level converter.

As shown in FIG. 2, the first to fourth switching elements SW1, SW2, SW3, and SW4 are electrically connected in series in this order from the positive electrode potential portion TP to the negative electrode potential portion TN. In the embodiment, a collector of the first switching element SW1 is electrically connected to the positive electrode potential portion TP. A collector of the second switching element SW2 is electrically connected to an emitter of the first switching element SW1. A collector of the third switching element SW3 is electrically connected to an emitter of the second switching element SW2. A collector of the fourth switching element SW4 is electrically connected to an emitter of the third switching element SW3. An emitter of the fourth switching element SW4 is electrically connected to the negative electrode potential portion TN. It should be noted that the neutral point potential portion TC is located between the positive electrode potential portion TP and the negative electrode potential portion TN.

In the embodiment, the AC voltage for any of the phases on the secondary side of the transformer 11 is supplied to an AC terminal T of the three-level converter 21. The AC terminal T is electrically connected to a connection portion CP3, which electrically connects the emitter of the second switching element SW2 and the collector of the third switching element SW3. Thereby, the emitter of the second switching element SW2 is electrically connected to the AC terminal T via the connection portion CP3. The collector of the third switching element SW3 is electrically connected to the AC terminal T via the connection portion CP3.

ON/OFF of the above-described first to fourth switching elements SW1 to SW4 are controlled by the gate pulse signals GPC transmitted from the converter control unit 100. It should be noted that the first to fourth switching elements SW1 to SW4 are driven via gate drive circuits (not shown).

Next, the first to fourth freewheeling diodes DF1, DF2, DF3, and DF4 will be described. The first freewheeling diode DF1 is electrically connected in reverse-parallel to the first switching element SW1. The second freewheeling diode DF2 is electrically connected in reverse-parallel to the second switching element SW2. The third freewheeling diode DF3 is electrically connected in reverse-parallel to the third switching element SW3. The fourth freewheeling diode DF4 is electrically connected in reverse-parallel to the fourth switching element SW4. The term "connected in reverse-parallel" means that the switching element and the freewheeling diode are electrically connected in parallel and a direction in which the current flows in the switching element in the forward direction is opposite to a direction in which the current flows in the freewheeling diode in the forward direction.

The clamp diodes DC1 and DC2 are connected in series and are interposed between connection points CP1 and CP2. A connection point CP4 of the clamp diodes DC1 and DC2 is electrically connected to the neutral point potential portion TC. The clamp diode DC1 has a cathode electrically connected to the connection point CP1 and an anode electrically connected to the connection point CP4. The clamp diode DC2 has a cathode electrically connected to the connection point CP4 and an anode electrically connected to the connection point CP2.

Figure 3:
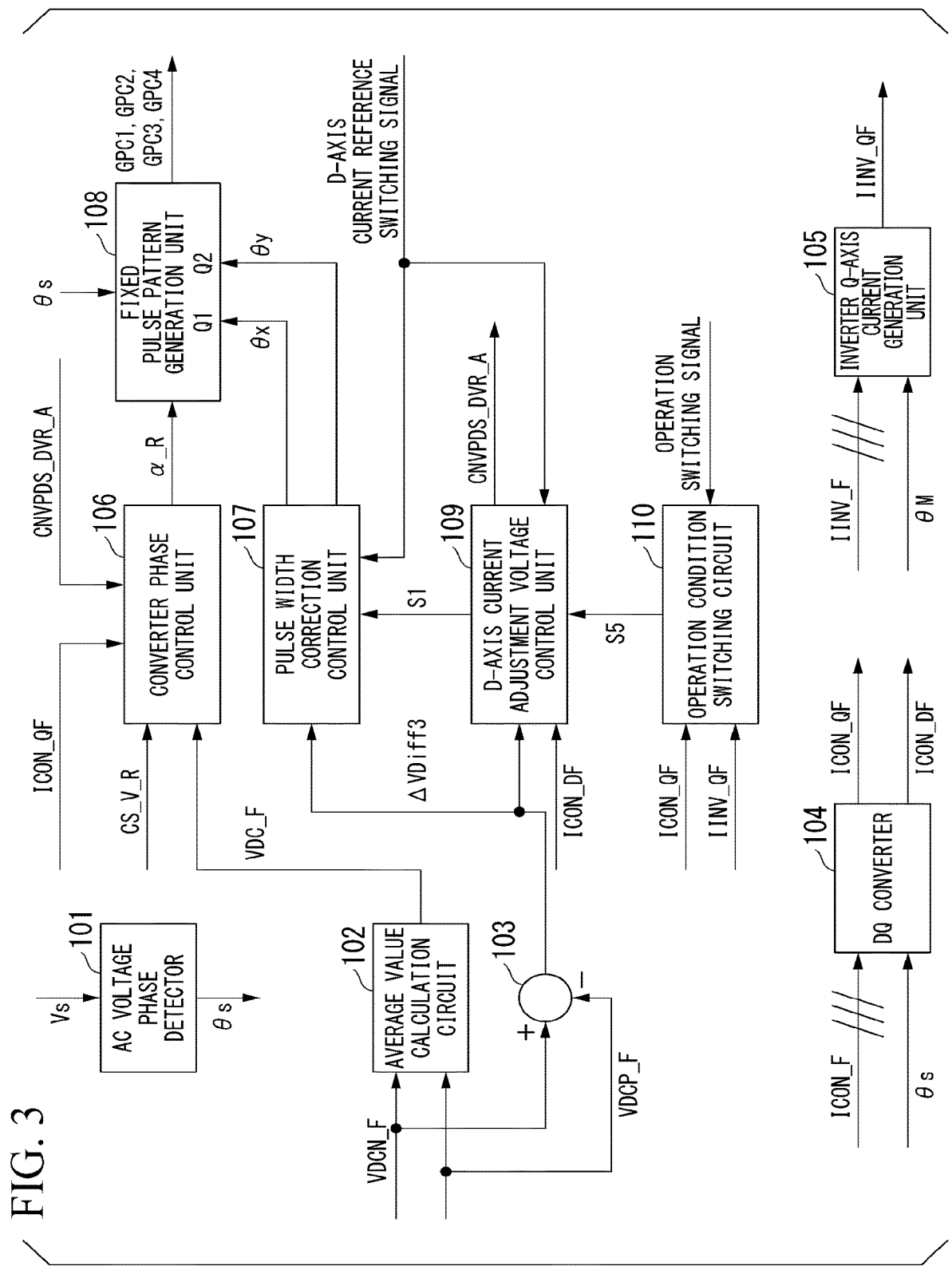
FIG. 3 is a diagram showing an example of a configuration of a converter control unit according to the embodiment.

Next, an internal configuration of the converter control unit 100 will be described with reference to FIG. 3. FIG. 3 is a diagram showing an example of a configuration of the converter control unit 100 according to the embodiment.

The converter control unit 100 includes at least an AC voltage phase detector 101, an average value calculation circuit 102, a difference calculator 103, a DQ converter 104, an inverter Q-axis current generation unit 105, a converter phase control unit 106, a pulse width correction control unit 107, a fixed pulse pattern generation unit 108, a D-axis current adjustment voltage control unit 109 (an instruction unit), and an operation condition switching circuit 110 (a switching unit).

At least a part of each of the converter control unit 100 and the inverter control unit 150 is implemented by a hardware processor such as a central processing unit (CPU) or a graphics processing unit (GPU) executing a program (software) stored in a storage unit. For example, some or all of these functional units may be implemented by hardware (a circuit unit; including circuitry) such as a large-scale integration (LSI), a field-programmable gate array (FPGA), and a GPU or may be implemented by software and hardware in cooperation.

The AC voltage phase detector 101 detects the phase of the AC voltage Vs from the AC voltage Vs supplied from the power supply voltage detector 13 using, for example, a phase locked loop (PLL). The AC voltage phase detector 101 outputs a reference phase θs synchronized with the detected AC voltage Vs, that is, synchronized with the three-phase AC power supply 10, to the DQ converter 104 and the fixed pulse pattern generation unit 108.

The average value calculation circuit 102 calculates an average value of the P-side DC voltage VDCP_F supplied from the DC voltage measuring instrument 201P and the N-side DC voltage VDCN_F supplied from the DC voltage measuring instrument 201N. The average value calculation circuit 102 outputs the average value of the P-side DC voltage VDCP_F and the N-side DC voltage VDCN_F obtained through the calculation as a DC voltage feedback VDC_F to the converter phase control unit 106.

The difference calculator 103 compares the above-described P-side DC voltage VDCP_F with the above-described N-side DC voltage VDCN_F and outputs a difference value ΔVDiff3 obtained by subtracting the P-side DC voltage VDCP_F from the N-side DC voltage VDCN_F to the pulse width correction control unit 107 and the D-axis current adjustment voltage control unit 109. The difference value ΔVDiff3 is an example of the "difference between the charging voltage of the first capacitor and the charging voltage of the second capacitor."

The DQ converter 104 converts the converter input current ICON_F (for three phases) measured by the input current detector 12 into components of two axes including a Q axis and a D axis included in a D-Q coordinate plane of the three-level converter 21 on the basis of the above-described reference phase θs. The Q axis and the D axis are orthogonal to each other. The DQ converter 104 generates a converter Q-axis current ICON_QF, which is one Q-axis component, and a converter D-axis current ICON_DF, which is the other D-axis component. Furthermore, the DQ converter 104 outputs the converter Q-axis current ICON_QF to the converter phase control unit 106 and the operation condition switching circuit 110 and outputs the converter D-axis current ICON_DF to the D-axis current adjustment voltage control unit 109. Here, by appropriately setting the reference phase θs, the converter Q-axis current ICON_QF corresponds to a component having the same phase as the voltage of the three-phase AC power supply 10, that is, an active current component viewed from the three-phase AC power supply 10, and the converter D-axis current ICON_DF corresponds to a current of which phase is advanced by 90 degrees with respect to the phase of the voltage of the three-phase AC power supply 10, that is, a reactive current component viewed from the three-phase AC power supply 10. This converter Q-axis current ICON_QF is an active current component of the input of the three-level converter 21. The converter Q-axis current ICON_QF can be equivalently regarded as a DC current if the circuit loss is ignored or can be regarded as an active current component output by the three-level inverter 22.

The inverter Q-axis current generation unit 105 converts the inverter output current IINV_F (for three phases) supplied from the output current detector 31 into a Q-axis component and a D-axis component that are orthogonal to each other on the basis of the rotor rotation angle θM supplied from the rotation angle detector 32 and generates at least an inverter Q-axis current IINV_QF, which is a Q-axis component. The meaning of the inverter Q-axis current IINV_QF will be described below. The inverter Q-axis current generation unit 105 outputs the generated inverter Q-axis current IINV_QF to the operation condition switching circuit 110. It should be noted that this inverter Q-axis current generation unit 105 may be included as a part of the inverter control unit 150, or the generated inverter Q-axis current IINV_QF may be output to the operation condition switching circuit 110 of the converter control unit 100.

The converter phase control unit 106 generates a phase command α_R for adjusting a fundamental wave phase of the output voltage of the three-level converter 21, that is, the phase of the fixed pulse pattern, with respect to the phase of the AC voltage Vs on the basis of a DC voltage reference value CS_V_R that has been set in advance, the DC voltage feedback VDC_F, which is the output of the average value calculation circuit 102, the converter Q-axis current ICON_QF, which is the output of the DQ converter 104, and a DC voltage reference correction value CNVPDS_DVR_A (to be described below), which is the output of the D-axis current adjustment voltage control unit 109. The converter phase control unit 106 supplies the generated phase command α_R to the fixed pulse pattern generation unit 108. The DC voltage reference value CS_V_R is a control target value for at least one of the P-side DC voltage VDCP_F and the N-side DC voltage VDCN_F. It should be noted that this DC voltage reference value CS_V_R may be a control target value for an average value of the P-side DC voltage VDCP_F and the N-side DC voltage VDCN_F. Also, the DC voltage reference value CS_V_R may be a control target value for a sum of the P-side DC voltage VDCP_F and the N-side DC voltage VDCN_F.

Here, as will be described below, the converter phase control unit 106 obtains the phase control command α_R so that the difference between the DC voltage feedback VDC_F and a sum of the DC voltage reference value CS_V_R and the DC voltage reference correction value CNVPDS_DVR_A is reduced.

The pulse width correction control unit 107 generates a pulse width correction value θx and a pulse width correction value Oy, which are control information for adjusting the pulse width of the specific pulse of the fixed pulse pattern supplied to the three-level converter 21 on the basis of the difference value ΔVDiff3 supplied from the difference calculator 103, a control signal S1 (to be described below) supplied from the D-axis current adjustment voltage control unit 109, and a D-axis current reference switching signal (to be described below). The pulse width correction control unit 107 supplies the pulse width correction value θx and the pulse width correction value Oy that have been generated to the fixed pulse pattern generation unit 108. That is, the pulse width correction control unit 107 controls discharging and charging of the capacitor 202P and the capacitor 202N and performs unbalance suppression control of the neutral point so that the difference value ΔVDiff3 between the P-side DC voltage VDCP_F of the capacitor 202P and the N-side DC voltage VDCN_F of the capacitor 202N is reduced. To this end, the pulse width correction control unit 107 adjusts the pulse width of the specific pulse of the fixed pulse pattern so that discharging and charging periods of each of the capacitor 202P and the capacitor 202N are controlled.

The fixed pulse pattern generation unit 108 adjusts the phases of the gate pulse signals GPC of the fixed pulse patterns supplied to the three-level converter 21 in accordance with the reference phase θs supplied from the AC voltage phase detector 101 and the phase command α_R supplied from the converter phase control unit 106 and outputs the adjusted gate pulse signals GPC to the three-level converter 21. The gate pulse signals GPC include a total of 12 gate pulse signals GPC for three phases, wherein gate pulse signals GPC1 to GPC4 of each phase supplied to the three-level converter 21 are provided for one phase. Each of the gate pulse signals GPC1 to GPC4 is supplied from the fixed pulse pattern generation unit 108 to the gate of one of the switching elements SW1, SW2, SW3, and SW4 of the leg 600 of the three-level converter 21 shown in FIG. 2 via the gate drive circuit.

Also, the fixed pulse pattern generation unit 108 adjusts the pulse width of the specific pulse of the fixed pulse pattern in accordance with the pulse width correction value θx and the pulse width correction value θy supplied from the pulse width correction control unit 107 to an input terminal Q1 and an input terminal Q2, respectively.

As will be described below, when the pulse width correction values θx and θy are supplied to the input terminal Q1 and the input terminal Q2, respectively, the fixed pulse pattern generation unit 108 generates a fixed pulse pattern in which the pulse width of the specific pulse has been adjusted. That is, when the magnitude of the charging voltage of the capacitor 202P is greater than the magnitude of the charging voltage of the capacitor 202N, the fixed pulse pattern generation unit 108 generates a fixed pulse pattern for performing control so as to suppress charging of the capacitor 202P and suppress discharging of the capacitor 202N in order to perform unbalance suppression control. When the magnitude of the charging voltage of the capacitor 202N is greater than the magnitude of the charging voltage of the capacitor 202P, the fixed pulse pattern generation unit 108 generates a fixed pulse pattern for performing control so as to suppress charging of the capacitor 202N and suppress discharging of the capacitor 202P in order to perform unbalance suppression control. It should be noted that when "the magnitudes of the charging voltages of the capacitors" are compared with each other, the absolute values of the charging voltages may be compared. In the following embodiment, when charging voltages are compared, the fact that an absolute value is large may be simply referred to as a "voltage is larger." It should be noted that even in this case, the absolute potentials of the paired capacitors are not compared with each other.

That is, when the pulse width of the specific pulse of the fixed pulse pattern is adjusted, the fixed pulse pattern generation unit 108 performs, for the capacitor 202P and the capacitor 202N, a process of reducing the width of a pulse region that defines a discharging time period of the capacitor having a smaller magnitude of the charging voltage (a lower charging voltage) so that the reduced width is shorter than the width before the adjustment and reducing the width of a pulse region that defines a charging time period of the capacitor having a larger magnitude of the charging voltage (a higher charging voltage) so that the reduced width is shorter than the width before the adjustment.

The D-axis current adjustment voltage control unit 109 generates the DC voltage reference correction value CNVPDS_DVR_A on the basis of the difference value ΔVDiff3, which is the output of the difference calculator 103, the converter D-axis current ICON_DF, which is an output of the DQ converter 104, a control signal S5, which is the output of the operation condition switching circuit 110, and the D-axis current reference switching signal. The D-axis current adjustment voltage control unit 109 supplies the generated DC voltage reference correction value CNVPDS_DVR_A to the converter phase control unit 106. The DC voltage reference correction value CNVPDS_DVR_A is a voltage value with which the converter phase control unit 106 corrects the voltage of the DC voltage reference value CS_V_R for the purpose of forcing a predetermined D-axis current (reactive current) necessary for neutral point control to flow through the three-level converter 21. Further, the D-axis current adjustment voltage control unit 109 outputs the control signal S1 to the pulse width correction control unit 107.

The operation condition switching circuit 110 sets the control signal S5 for the D-axis current adjustment voltage control unit 109 on the basis of an operation switching signal, which is a signal representing whether the DC voltage reference correction value CNVPDS_DVR_A is generated on the basis of the current value of the converter Q-axis current ICON_QF or on the basis of the current value of the inverter Q-axis current IINV_QF. Here, the operation switching signal is a signal for setting whether the D-axis current adjustment voltage control process is performed on the basis of the converter Q-axis current ICON_QF or on the basis of the inverter Q-axis current IINV_QF. Depending on the system, the operation switching signal may be switched within the converter control unit 100, may be switched from the outside, or may be fixed as either the converter Q-axis current ICON_QF or the inverter Q-axis current IINV_QF.

Figure 4:
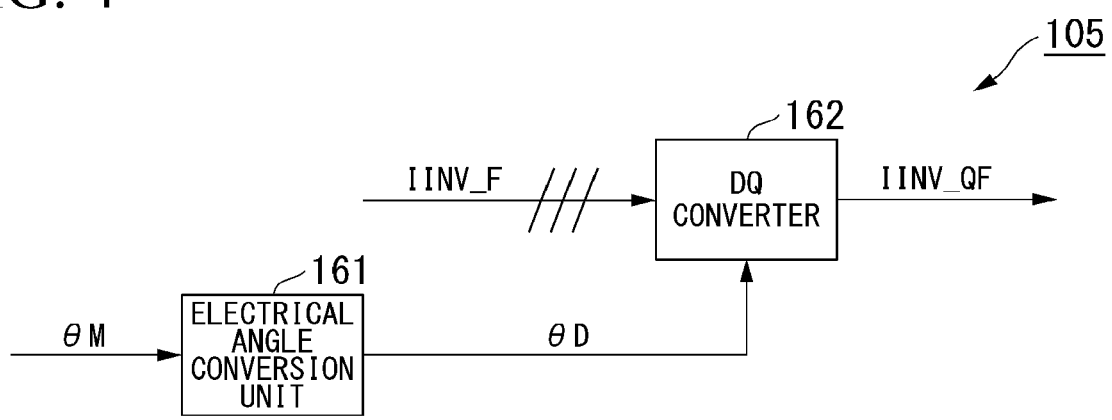
FIG. 4 is a diagram showing an example of a configuration of an inverter Q-axis current generation unit according to the embodiment.

Next, a configuration of the inverter Q-axis current generation unit 105 will be described. FIG. 4 is a diagram showing an example of a configuration of the inverter Q-axis current generation unit 105 according to the embodiment. In FIG. 4, the inverter Q-axis current generation unit 105 includes an electrical angle conversion unit 161 and a DQ converter 162.

The electrical angle conversion unit 161 converts the rotor rotation angle θM, which is the angle of the rotor of the three-phase AC motor 500 input from the rotation angle detector 32, into an electrical angle θD (=θM·P) and outputs the electrical angle θD to the DQ converter 162. Here, P is the number of pole pairs of the three-phase AC motor 500.

The DQ converter 162 converts the inverter output current IINV_F (for three phases) measured by the output current detector 31 into components of two axes including the Q axis and the D axis, which are orthogonal to each other, on the basis of the electrical angle θD supplied from the electrical angle conversion unit 161.

For example, the DQ converter 162 generates the inverter Q-axis current IINV_QF, which is a Q-axis component, and an inverter D-axis current IINV_DF, which is the other D-axis component. Here, by appropriately setting the electrical angle θD, the inverter Q-axis current INV_QF corresponds to the active current component output by the inverter 22 and the inverter D-axis current IINV_DF corresponds to the reactive current component. The DQ converter 162 outputs the generated inverter Q-axis current IINV_QF to the operation condition switching circuit 110.

Figure 5:
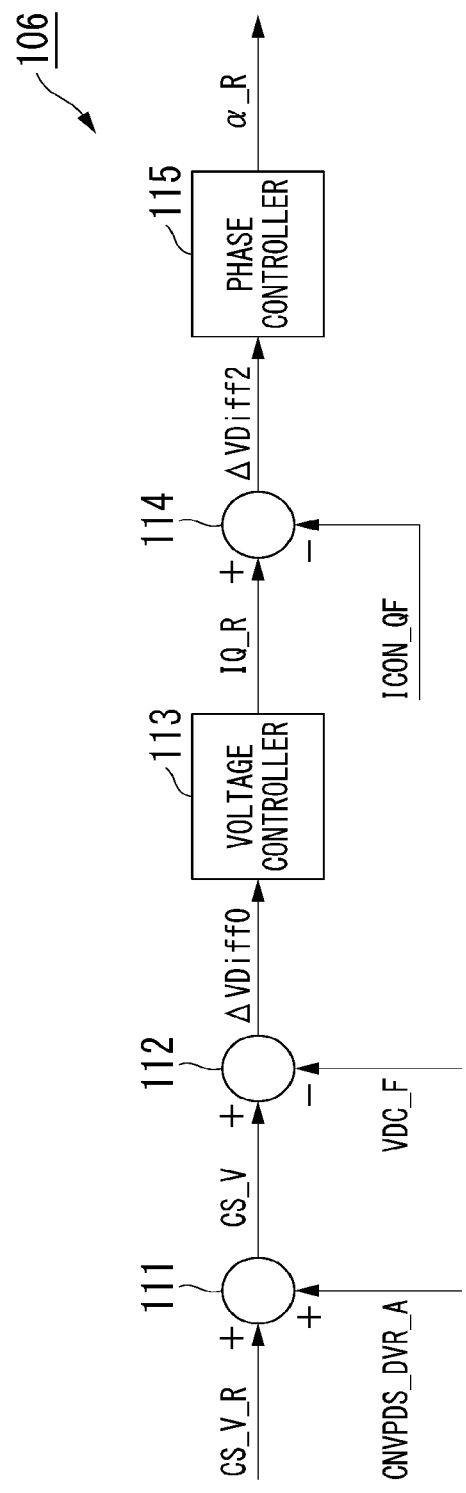
FIG. 5 is a diagram showing an example of a configuration of a converter phase control unit according to the embodiment.

Next, a configuration of the converter phase control unit 106 will be described. FIG. 5 is a diagram showing an example of a configuration of the converter phase control unit 106 according to the embodiment. In FIG. 5, the converter phase control unit 106 includes an adder 111, a difference calculator 112, a voltage controller 113, a difference calculator 114, and a phase controller 115.

The adder 111 adds the DC voltage reference value CS_V_R, which has been set in advance, to the DC voltage reference correction value CNVPDS_DVR_A supplied from the D-axis current adjustment voltage control unit 109 and outputs a corrected DC voltage reference value CS_V, which is an addition result, to the difference calculator 112.

The difference calculator 112 compares the DC voltage reference value CS_V supplied from the adder 111 with the DC voltage feedback VDC_F supplied from the average value calculation circuit 102, generates a difference value ΔVDiff0 obtained by subtracting the DC voltage feedback VDC_F from the DC voltage reference value CS_V, and outputs the generated difference value ΔVDiff0 to the voltage controller 113.

The voltage controller 113 is, for example, a proportional integral (PI) controller, and outputs a Q-axis current command value IQ_R for performing control so that the difference value ΔVDiff0 supplied from the difference calculator 112 approaches a minimum value (approaches "0") to the difference calculator 114.

It should be noted that a process of causing the difference value ΔVDiff0 to approach the minimum value is equivalent to a process of causing the DC voltage feedback VDC_F to approach a control target value corresponding thereto. The control target value in this case is, for example, the DC voltage reference value CS_V obtained by adding the DC voltage reference correction value CNVPDS_DVR_A to the DC voltage reference value CS_V_R.

The difference calculator 114 compares the Q-axis current command value IQ_R supplied from the voltage controller 113 with the converter Q-axis current ICON_QF supplied from the DQ converter 104, obtains a difference value ΔVDiff2 by subtracting the converter Q-axis current ICON_QF from the Q-axis current command value IQ_R, and outputs the obtained difference value ΔVDiff2 to the phase controller 115.

The phase controller 115 is, for example, a P1 controller and outputs the phase command α_R for controlling the phase of the fixed pulse pattern for performing control so that the difference value ΔVDiff2 supplied from the difference calculator 114 approaches the minimum value (approaches "0") to the fixed pulse pattern generation unit 108.

It should be noted that in the above embodiment, an example has been described in which the converter control unit 100 generates the corrected DC voltage reference value CS_V using the adder 111, which adds the DC voltage reference correction value CNVPDS_DVR_A to the DC voltage reference value CS_V_R. A calculation process for generating the DC voltage reference value CS_V is not limited to this and the DC voltage reference value CS_V may be generated without using the adder 111.

For example, the converter control unit 100 according to a first modified example may correct the DC voltage reference correction value CNVPDS_DVR_A by multiplying the DC voltage reference value CS_V_R by a coefficient corresponding to the DC voltage reference correction value CNVPDS_DVR_A, to generate the DC voltage reference value CS_V.

For example, the converter control unit 100 according to a second modified example may extract the DC voltage reference value CS_V using a conversion table. For example, the above-described conversion table is formed as a two-dimensional table having a DC voltage reference value CS_V_R and a DC voltage reference correction value CNVPDS_DVR_A as axes. The conversion table stores a DC voltage reference value CS_V corresponding to a combination of a DC voltage reference value CS_V_R and a DC voltage reference correction value CNVPDS_DVR_A.

Figure 6:
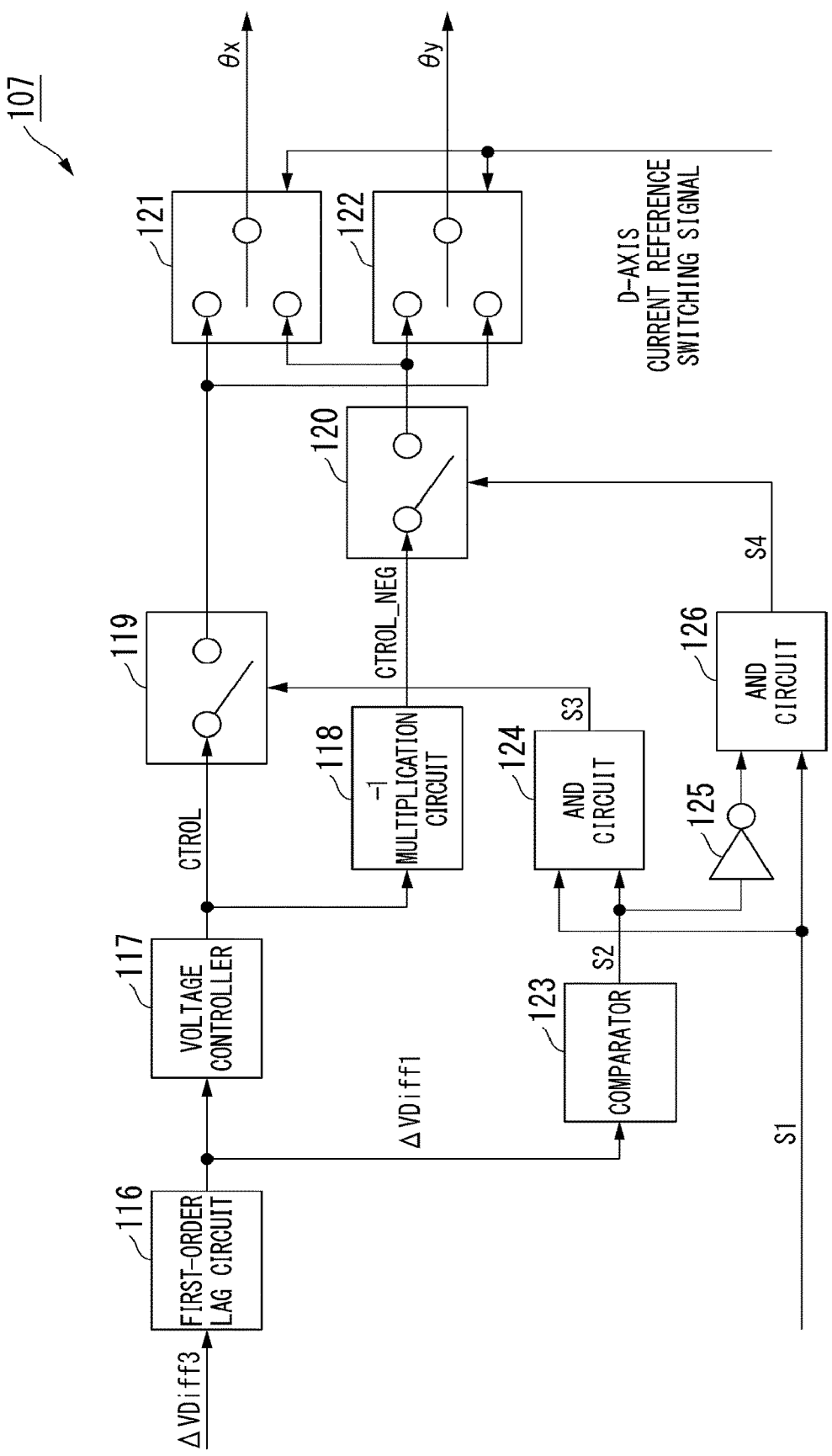
FIG. 6 is a diagram showing an example of a configuration of a pulse width correction control unit according to the embodiment.

Next, a configuration of the pulse width correction control unit 107 will be described. FIG. 6 is a diagram showing an example of a configuration of the pulse width correction control unit 107 according to the embodiment. In FIG. 6, the pulse width correction control unit 107 includes a first-order lag circuit 116, a voltage controller 117, a −1 multiplication circuit 118, switches 119 and 120, changeover switches 121 and 122, a comparator 123, an AND circuit 124, an inversion (NOT) circuit 125, and an AND circuit 126.

The first-order lag circuit 116 generates a difference value ΔVDiff1 obtained by generating a first-order lag for a change in the signal level of the difference value ΔVDiff3 supplied from the difference calculator 103 and outputs the difference value ΔVDiff1 to the voltage controller 117 and the comparator 123.

The voltage controller 117 is, for example, a PI controller and outputs a pulse width correction value CTROL for performing control for causing the difference value ΔVDiff1 supplied from the first-order lag circuit 116 to approach a minimum value, to an input terminal of the switch 119 and the −1 multiplication circuit 118.

The −1 multiplication circuit 118 multiplies the pulse width correction value CTROL supplied from the voltage controller 117 by "−1," generates a pulse width correction value CTROL_NEG, and outputs the generated pulse width correction value CTROL_NEG to an input terminal of the switch 120.

The switch 119 has the input terminal connected to the output of the voltage controller 117, an output terminal connected to a first input terminal of the changeover switch 121 and a second input terminal of the changeover switch 122, and a control terminal to which a control signal S3 is supplied from an output terminal of the AND circuit 124. The switch 119 electrically connects the input terminal and the output terminal when the level of the control signal S3 input from the AND circuit 124 to the control terminal of the switch 119 becomes the "H" level. Thereby, the switch 119 supplies the pulse width correction value CTROL supplied from the voltage controller 117 to the first input terminal of the changeover switch 121 and the second input terminal of the changeover switch 122.

The switch 120 has the input terminal connected to the output of the −1 multiplication circuit 118, an output terminal connected to a first input terminal of the changeover switch 122 and a second input terminal of the changeover switch 121, and a control terminal to which a control signal S4 is supplied from an output terminal of the AND circuit 126. The switch 120 electrically connects the input terminal and the output terminal when the level of the control signal S4 input from the AND circuit 126 to the control terminal becomes the "H" level. Thereby, the switch 120 supplies the first input terminal of the changeover switch 122 and the second input terminal of the changeover switch 121 with the pulse width correction value CTROL_NEG, which is supplied from the −1 multiplication circuit 118 and is obtained by multiplying the pulse width correction value CTROL by "−1".

The changeover switch 121 has the first input terminal connected to the output terminal of the switch 119, the second input terminal connected to the output terminal of the switch 120, an output terminal connected to the input terminal Q1 of the fixed pulse pattern generation unit 108, and a control terminal to which a D-axis current reference switching signal is input. Here, the D-axis current reference switching signal is a switching signal used for determining whether the D-axis current serving as a reactive current flowing through the three-level converter 21 is to be set to a positive (+) current value (a lagging power factor) or to a negative (−) current value (a leading power factor). Depending on the system, the D-axis current reference switching signal may be switched within the converter control unit 100, may be switched from the outside, or may be fixed to either the lagging power factor or the leading power factor.

The changeover switch 121 connects the first input terminal and the output terminal when the D-axis current reference switching signal represents that the lagging power factor is selected (e.g., in the case of the "H" level). The changeover switch 121 connects the second input terminal and the output terminal when the D-axis current reference switching signal represents that the leading power factor is selected (e.g., in the case of the "L" level). In this manner, the changeover switch 121 outputs the signal input to either the first input terminal or the second input terminal as the pulse width correction value θx.

The changeover switch 122 has the first input terminal connected to the output terminal of the switch 120, the second input terminal connected to the output terminal of the switch 119, an output terminal connected to the input terminal Q2 of the fixed pulse pattern generation unit 108, and a control terminal to which the D-axis current reference switching signal is input. The changeover switch 122 connects the first input terminal and the output terminal when the D-axis current reference switching signal represents that the lagging power factor is selected. The changeover switch 122 connects the second input terminal and the output terminal when the D-axis current reference switching signal represents that the leading power factor is selected. In this manner, the changeover switch 122 outputs the signal input to either the first input terminal or the second input terminal as the pulse width correction value θy.

The comparator 123 determines whether or not the difference value ΔVDiff1 supplied from the first-order lag circuit 116 is greater than or equal to a predetermined value, for example, "0," sets the level of a control signal S2 to the "H" level when the difference value ΔVDiff1 exceeds "0," and sets the level of the control signal S2 to the level when the difference value ΔVDiff1 is less than "0." The comparator 123 outputs the control signal S2, which is to be output, to a second input terminal of the AND circuit 124 and the input terminal of the inversion circuit 125.

It should be noted that when the charging voltage of the capacitor 202N is higher than the charging voltage of the capacitor 202P, the difference value ΔVDiff1 exceeds 0. When the charging voltage of the capacitor 202P is higher than the charging voltage of the capacitor 202N, the difference value ΔVDiff1 becomes less than 0. The comparator 123 determines whether the difference value ΔVDiff1 is positive or negative, binarizes a determination result, and outputs the control signal S2.

The AND circuit 124 has a first input terminal to which the control signal S1 is supplied from the D-axis current adjustment voltage control unit 109, the second input terminal connected to the output terminal of the comparator 123, and the output terminal connected to the control terminal of the switch 119. The AND circuit 124 outputs the control signal S3 to the control terminal of the switch 119.

The inversion circuit 125 inverts the signal level of the input control signal S2 output from the comparator 123 and outputs an inverted signal to a first input terminal of the AND circuit 126.

The AND circuit 126 has the first input terminal connected to the output terminal of the inversion circuit 125 and a second input terminal to which the control signal S1 from the D-axis current adjustment voltage control unit 109 is supplied. The AND circuit 126 has the output terminal connected to the control terminal of the switch 120 and outputs the control signal S4 to the control terminal of the switch 120. With this configuration, the pulse width correction control unit 107 is configured so that the outputs of the switches 119 and 120 do not have negative values. That is, the pulse width correction control unit 107 is configured so that the outputs do not become negative values.

With the configuration described above, the control states of the pulse width correction control unit 107 are classified into cases as described below. This case classification is identified by a combination of the logical states of signals including the control signal S1, the control signal S2, and the D-axis current switching signal. It should be noted that the state of the control signal S2 is determined on the basis of the value (positive or negative) of the difference value ΔVDiff1.

The pulse width correction control unit 107 outputs the pulse width correction value CTROL to the input terminal Q1 of the fixed pulse pattern generation unit 108 as the pulse width correction value θx when the charging voltage of the capacitor 202N is higher than the charging voltage of the capacitor 202P, the difference between the charging voltages is greater than a predetermined value for determining the necessity of unbalance suppression control, and the D-axis current switching signal causes a reactive current of a lagging power factor to flow. At this time, the pulse width correction control unit 107 outputs "0" to the input terminal Q2 of the fixed pulse pattern generation unit 108 as the pulse width correction value θy.

The pulse width correction control unit 107 outputs the pulse width correction value CTROL_NEG to the input terminal Q2 of the fixed pulse pattern generation unit 108 as the pulse width correction value θy when the charging voltage of the capacitor 202P is higher than the charging voltage of the capacitor 202N, the difference between the charging voltages is greater than the predetermined value for determining the necessity of unbalance suppression control, and the D-axis current switching signal causes a reactive current of a lagging power factor to flow. At this time, the pulse width correction control unit 107 outputs "0" to the input terminal Q1 of the fixed pulse pattern generation unit 108 as the pulse width correction value θx.

In contrast, the pulse width correction control unit 107 outputs the pulse width correction value CTROL to the input terminal Q2 of the fixed pulse pattern generation unit 108 as the pulse width correction value θy when the charging voltage of the capacitor 202N is higher than the charging voltage of the capacitor 202P, the difference between the charging voltages is greater than the predetermined value for determining the necessity of unbalance suppression control, and the D-axis current switching signal causes a reactive current of a leading power factor to flow. At this time, the pulse width correction control unit 107 outputs "0" to the input terminal Q1 of the fixed pulse pattern generation unit 108 as the pulse width correction value θx.

The pulse width correction control unit 107 outputs the pulse width correction value CTROL_NEG to the input terminal Q1 of the fixed pulse pattern generation unit 108 as the pulse width correction value θx when the charging voltage of the capacitor 202P is higher than the charging voltage of the capacitor 202N, the difference between the charging voltages is greater than the predetermined value for determining the necessity of unbalance suppression control, and the D-axis current switching signal causes the reactive current of the leading power factor to flow. At this time, the pulse width correction control unit 107 outputs "0" to the input terminal Q2 of the fixed pulse pattern generation unit 108 as the pulse width correction value θy.

Figure 7:
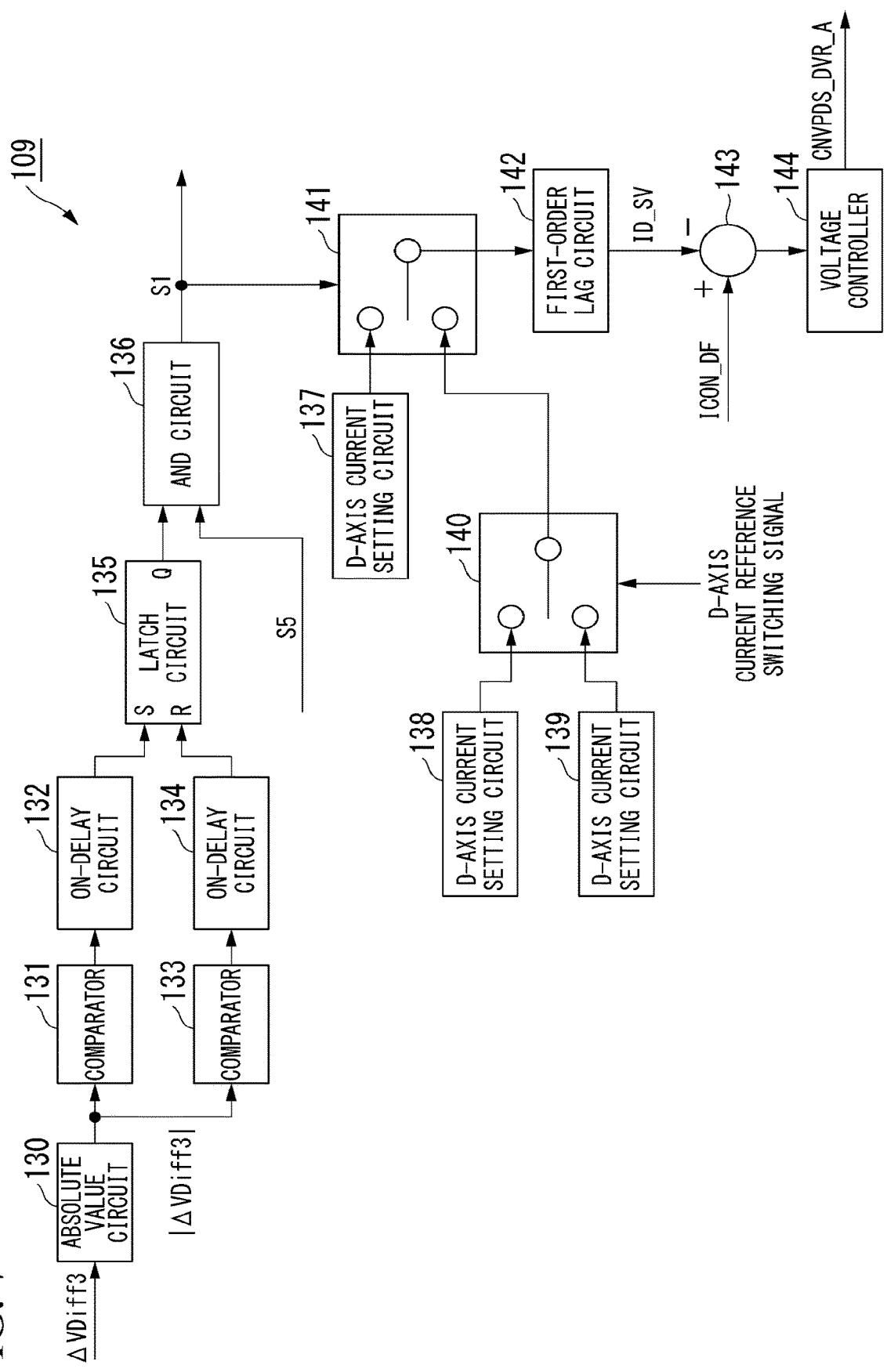
FIG. 7 is a diagram showing an example of a configuration of a D-axis current adjustment voltage control unit according to the embodiment.

Next, a configuration of the D-axis current adjustment voltage control unit 109 will be described. FIG. 7 is a diagram showing an example of a configuration of the D-axis current adjustment voltage control unit 109 according to the embodiment. In FIG. 7, the D-axis current adjustment voltage control unit 109 includes an absolute value circuit 130, a comparator 131, an on-delay circuit 132, a comparator 133, an on-delay circuit 134, a latch circuit 135, an AND circuit 136, D-axis current setting circuits 137 to 139, changeover switches 140 and 141, a first-order lag circuit 142, a difference calculator 143, and a voltage controller 144.

The absolute value circuit 130 calculates an absolute value of the difference value ΔVDiff3 supplied from the difference calculator 103 and outputs the absolute difference value |ΔVDiff3| to the comparators 131 and 133.

The comparator 131 compares a threshold value AAR_VDC_H that has been set in advance with the absolute difference value |ΔVDiff3| and outputs a signal DH of the "H" level to the on-delay circuit 132 when the absolute difference value |ΔVDiff3| exceeds the threshold value AAR_VDC_H. Here, the threshold value AAR_VDC_H is set to a predetermined proportion of the DC voltage reference value CS_V_R, and is, for example, 6% of the DC voltage reference value CS_V_R. Here, the threshold value AAR_VDC_H is a threshold value used for determining whether or not the condition for starting the unbalance suppression control is satisfied.

The on-delay circuit 132 delays the rising of the signal DH supplied from the comparator 131 from the "L" level to the "H" level by a predetermined time period t1 and outputs the delayed signal DH to a set terminal S of the latch circuit 135. In contrast, the on-delay circuit 132 does not delay the falling from the "H" level to the "L" level.

The comparator 133 compares a threshold value AAR_VDC_L that has been set in advance with the absolute difference value |ΔVDiff3| from the absolute value circuit 130 and outputs a signal DL of the "H" level to the on-delay circuit 134 when the absolute difference value |ΔVDiff3| is less than the threshold value AAR_VDC_L. Here, the threshold value AAR_VDC_L is a threshold value used for determining whether or not the condition for stopping the unbalance suppression control is satisfied. The threshold value AAR_VDC_L is a numerical value less than the threshold value AAR_VDC_H, and is set to a predetermined proportion of the DC voltage reference value CS_V_R, and is, for example, 3% of the DC voltage reference value CS_V_R. It should be noted that the threshold value AAR_VDC_H and the threshold value AAR_VDC_L may have the same value.

The on-delay circuit 134 delays the rising of the signal DL supplied from the comparator 133 from the "L" level to the "H" level by a predetermined time period t2 and outputs the delayed signal DL to the reset terminal R of the latch circuit

135. In contrast, the on-delay circuit 134 does not delay the falling from the "H" level to the "L" level. For example, the time period t2 may be set to be longer than the time period t1. That is, a period from the time when the absolute difference value |ΔVDiff3| becomes less than the threshold value AAR_VDC_L to the time when control for reducing the absolute difference value |ΔVDiff3| stops may be set to be longer than a period from the time when the absolute difference value |ΔVDiff3| becomes greater than or equal to the threshold value AAR_VDC_H to the time when control for reducing the absolute difference value |ΔVDiff3| starts.

An output of the latch circuit 135 is output to a first input terminal of the AND circuit 136. Here, the comparator 133, the on-delay circuit 134, and the latch circuit 135 delay the signal DH supplied from the comparator 131 and the signal DL supplied from the comparator 133 to delay the determination of the absolute difference value |ΔVDiff3|, restrict the iteration of an operation in which the latch circuit 135 changes a retained state at short intervals, and stabilize control for setting the current value of a D-axis current.

Here, when it is necessary to perform unbalance suppression control, the "H" level signal is supplied from the output terminal of the on-delay circuit 132 to the set terminal S of the latch circuit 135 and the "H" level signal is output from the output terminal of the latch circuit 135. When it is not necessary to perform the unbalance suppression control, the "H" level signal is supplied from the output terminal of the on-delay circuit 134 to the reset terminal R of the latch circuit 135 and the "L" level signal is output from the output terminal of the latch circuit 135.

The AND circuit 136 has the first input terminal connected to the output terminal Q of the latch circuit 135 and a second input terminal to which the control signal S5 is supplied from the output terminal of the operation condition switching circuit 110 (FIG. 3). The AND circuit 136 is a two-input logical conjunction circuit. The AND circuit 136 has an output terminal connected to a control terminal of the changeover switch 141 and the pulse width correction control unit 107. For example, the control signal S5 of the "H" level is supplied from the operation condition switching circuit 110 when the converter Q-axis current ICON_QF or an inverter Q-axis current IINC_QF is less than a predetermined value.

In the D-axis current setting circuit 137, a predetermined value that has been determined in advance, for example, "0," is set as the current value of the D-axis current, and the D-axis current setting circuit 137 outputs the set current value "0" to a first input terminal of the changeover switch 141. When the above-described predetermined value "0" has been selected by the changeover switch 141, the D-axis current setting circuit 137 sets the D-axis current setting value to "0." That is, the selection of the predetermined value "0" means that the three-level converter 21 is operated so that the power factor approaches "1."

In the D-axis current setting circuit 138, a predetermined value that has been determined in advance, for example, "+10%," is set as the current value of the D-axis current, and the D-axis current setting circuit 138 outputs, for example, the set current value of "+10%" of the rated current of the D-axis current, to a first input terminal of the changeover switch 140. The above-described predetermined value "+10%" means that, when this numerical value has been selected, the three-level converter 21 is operated so that the lagging reactive current approaches "10%" with respect to the rated current.

In the D-axis current setting circuit 139, a predetermined value that has been determined in advance, for example, "−10%," is set as the current value of the D-axis current, and the D-axis current setting circuit 139 outputs, for example, the set current value of "−10%" of the rated current of the D-axis current, to a second input terminal of the changeover switch 140. The above-described predetermined value "−10%" means that, when this numerical value has been selected, the three-level converter 21 is operated so that the leading reactive current approaches "10%" with respect to the rated current.

The changeover switch 140 has the first input terminal connected to the output terminal of the D-axis current setting circuit 138, the second terminal connected to the output terminal of the D-axis current setting circuit 139, a control terminal to which the D-axis current reference switching signal is input, and an output terminal connected to the second input terminal of the changeover switch 141. When the D-axis current reference switching signal represents that the lagging power factor is selected, the changeover switch 140 connects the first input terminal and the output terminal and outputs the set current value of +10% of the rated current of the D-axis current from the D-axis current setting circuit 138 to the second input terminal of the changeover switch 141. In contrast, when the D-axis current reference switching signal represents that the leading power factor is selected, the changeover switch 140 connects the second input terminal and the output terminal and outputs the set current value of −10% of the rated current of the D-axis current from the D-axis current setting circuit 139 to the second input terminal of the changeover switch 141.

The current value set by each of the D-axis current setting circuits 138 and 139 may be any current value within a range allowed by the three-phase AC power supply 10 as long as the unbalance suppression control can be performed.

The changeover switch 141 has the first input terminal connected to the output terminal of the D-axis current setting circuit 137, the second input terminal connected to the output terminal of the changeover switch 140, and the control terminal connected to the output terminal of the AND circuit 136. The changeover switch 141 connects the first input terminal and the output terminal when the "L" level has been input from the AND circuit 136 to the control terminal. In contrast, the changeover switch 141 connects the second input terminal and the output terminal when the control signal S1 of the "H" level has been input from the AND circuit 136 to the control terminal.

The first-order lag circuit 142 generates a set current value ID_SV of a first-order lag for the input signal supplied from the changeover switch 141 and outputs the set current value ID_SV to the difference calculator 143. A time constant of the first-order lag is less than or equal to a time constant of voltage control by the phase command α_R to restrict the occurrence of a transient response caused by a sudden change in the set value. Thereby, it is possible to prevent a sudden change in a D-axis current setting value due to the start and stop of the unbalance suppression control and to stably operate the three-level converter 21. It should be noted that the first-order lag circuit 142 may be a rate limiting circuit that limits a rate of change in its output.

The difference calculator 143 subtracts the set current value ID_SV supplied from the first-order lag circuit 142 from the converter D-axis current ICON_DF supplied from the DQ converter 104 to generate a difference value ΔIDiff1 and outputs the generated difference value ΔIDiff1 to the voltage controller 144. This set current value ID_SV corresponds to the D-axis current setting value, which is a reactive current generated in the first-order lag circuit 142 and flowing through the three-level converter 21.

The voltage controller 144 is, for example, a PI controller, generates the DC voltage reference correction value CNVPDS_DVR_A for performing control so that the difference value supplied from the difference calculator 143 approaches a minimum value, and outputs the generated DC voltage reference correction value CNVPDS_DVR_A to the converter phase control unit 106.

To perform unbalance suppression control, it is necessary for the three-level converter 21 to cause a predetermined AC input current to flow.

The converter Q-axis current ICON_QF is an active current component of the AC input current of the three-level converter 21 and the current value thereof is basically determined by the state of the three-phase AC motor 500 and the loss of the three-level power conversion device 1. Thus, it is necessary to perform control for increasing the converter Q-axis current ICON_DF, which is a reactive current component, in order that a predetermined AC current flows through the three-level converter 21. It is difficult to perform control for increasing the converter Q-axis current ICON_DF by only adjusting the phase command α_R for adjusting the phase of the fixed pulse pattern for the three-level converter 21.

Therefore, the D-axis current adjustment voltage control unit 109 determines a condition necessary to start the unbalance suppression control, and when the condition for starting the unbalance suppression control has been satisfied, sets the level of the control signal S1 to the "H" level and outputs the control signal S1. Further, the D-axis current adjustment voltage control unit 109 generates the DC voltage reference correction value CNVPDS_DVR_A so that the difference between the converter Q-axis current ICON_DF and a predetermined value that has been determined in advance as the current value of the D-axis current in the D-axis current setting circuit 138 or the D-axis current setting circuit 139 is reduced and outputs the DC voltage reference correction value CNVPDS_DVR_A to the converter phase control unit 106.

Thereby, the charging voltages of the capacitors 201P and 201N of the three-level converter 21 change so as to correspond to the DC voltage reference correction value CNVPDS_DVR_A, as compared with a case in which the unbalance suppression control is not performed. Therefore, the amplitude of the AC voltage of the three-level converter 21 also changes as compared with a case in which the unbalance suppression control is not performed, so that the AC input current of the three-level converter 21 includes a predetermined reactive power component.

It should be noted that the three-level converter 21 operates in the vicinity of a zero power factor when the unbalance suppression control is performed because the value of the converter Q-axis current ICON_DF is small.

It should be noted that the D-axis current adjustment voltage control unit 109 sets the output of the DC voltage reference correction value CNVPDS_DVR_A to zero when the condition requiring the unbalance suppression control is not satisfied.

Figure 8:
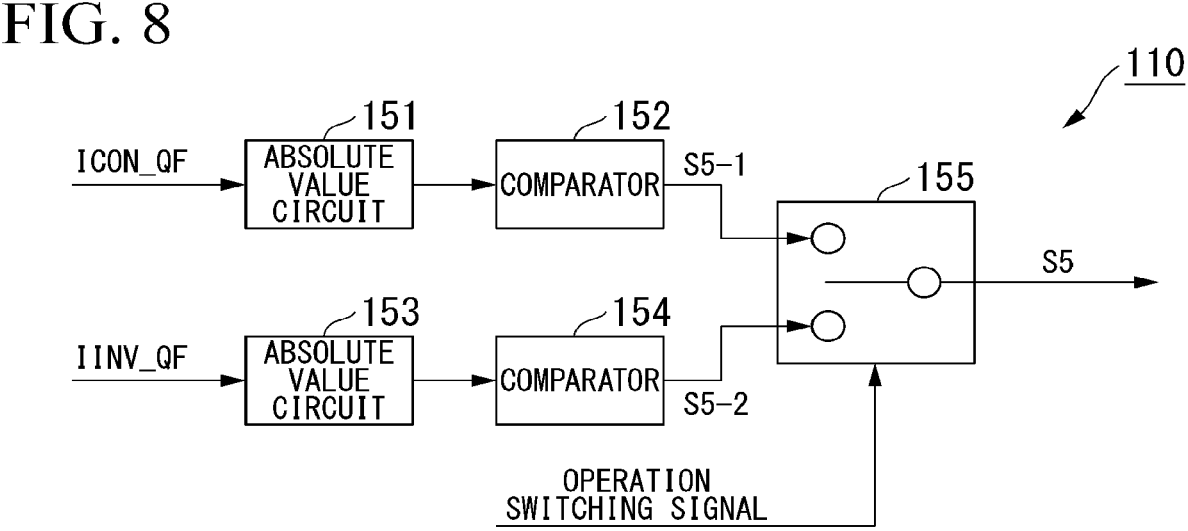
FIG. 8 is a diagram showing an example of a configuration of an operation condition switching circuit according to the embodiment.

Next, a configuration of the operation condition switching circuit 110 will be described. FIG. 8 is a diagram showing an example of a configuration of the operation condition switching circuit 110 according to the embodiment. In FIG. 8, the operation condition switching circuit 110 includes an absolute value circuit 151, a comparator 152, an absolute value circuit 153, a comparator 154, and a changeover switch 155.

The absolute value circuit 151 calculates an absolute current value ICON_QF_ABS as an absolute value of the converter Q-axis current ICON_QF from the DQ converter 104 and outputs the absolute current value ICON_QF_ABS of a calculation result to the comparator 152.

The comparator 152 compares the absolute current value ICON_QF_ABS supplied from the absolute value circuit 151 with a predetermined first Q-axis current value that has been set in advance and outputs a control signal S51 of the "H" level to a first input terminal of the changeover switch 155 when the absolute current value ICON_QF_ABS is less than the predetermined first Q-axis current value. The predetermined first Q-axis current value is a current value serving as a threshold value for determining whether or not the D-axis current is to be set in the unbalance suppression control.

The absolute value circuit 153 calculates an absolute current value IINV_QF_ABS as an absolute value of the inverter Q-axis current IINV_QF from the DQ converter 105 and outputs the absolute current value IINV_QF_ABS of a calculation result to the comparator 154.

The comparator 154 compares the absolute current value IINV_QF_ABS supplied from the absolute value circuit 153 with a predetermined second Q-axis current value that has been set in advance and outputs a control signal S5_2 of the "H" level to a second input terminal of the changeover switch 155 when the absolute current value ICON_QF_ABS is less than the predetermined second Q-axis current value. The predetermined second Q-axis current value is a current value serving as a threshold value for determining whether or not the D-axis current is to be set in the unbalance suppression control.

The changeover switch 155 has the first input terminal connected to the output of the comparator 152, the second input terminal connected to the output of the comparator 154, and a control terminal to which the operation switching signal is supplied. The changeover switch 155 has an output terminal connected to the second input terminal of the AND circuit 136 within the D-axis current adjustment voltage control unit 109. The changeover switch 155 connects the first input terminal and the output terminal when the operation switching signal supplied to the control terminal is at, for example, the "H" level, and connects the second input terminal and the output terminal when the operation switching signal is at the "L" level.

Here, when the operation switching signal is at the "H" level, this means that, if the absolute current value ICON_QF_ABS is less than the predetermined first Q-axis current that has been set in advance, the phase of the fixed pulse pattern is changed, the pulse width of the specific pulse of the fixed pulse pattern is adjusted, and the unbalance suppression control on the neutral point voltage is performed. In contrast, when the operation switching signal is at the "L" level, this means that, if the absolute current value IINV_QF_ABS is less than the predetermined second Q-axis current value that has been set in advance, the phase of the fixed pulse pattern is changed, the pulse width of the specific pulse of the fixed pulse pattern is adjusted, and the unbalance suppression control on the neutral point voltage is performed.

For example, the operation switching signal may change in accordance with at least any one of the following conditions of:

whether or not an active current of an output current output from at least one three-level inverter 22 or a maximum value of the active current is greater than or equal to a threshold value, whether or not at least one of a sum of active currents of output currents output from a plurality of three-level inverters 22, an average value of the active currents of the output currents, and a maximum value of the active current of each output current is greater than or equal to a threshold value, and whether or not one of a value related to a current value of a DC current output by the three-level converter 21 and a value related to an active current of an input current input to the three-level converter 21 is greater than or equal to a threshold value.

For example, with respect to each of the above cases, when each value in each of the above cases is greater than or equal to the threshold value, the operation condition switching circuit 110 performs control so that the unbalance suppression control by the three-level inverter 22 is not performed.

The operation condition switching circuit 110 outputs a control command determined by the operation switching signal as the control signal S5 by switching the state of the control signal S5 on the basis of the above-described operation switching signal.

In response thereto, for example, the D-axis current adjustment voltage control unit 109 selects either a lagging phase or a leading phase of the reactive current of the three-level converter 21. The D-axis current adjustment voltage control unit 109 receives the control signal S5, determines that the reactive current of the selected phase described above flows through the three-level converter 21 on the basis of the control signal S5, and transmits the DC voltage reference correction value CNVPDS_DVR_A, which is a control instruction thereof, to the converter phase control unit 106. The converter phase control unit 106 controls the phase command α_R for controlling the phase of the fixed pulse pattern. This phase command α_R is used for the calculation process of the fixed pulse pattern generation unit 108.

Figure 9:
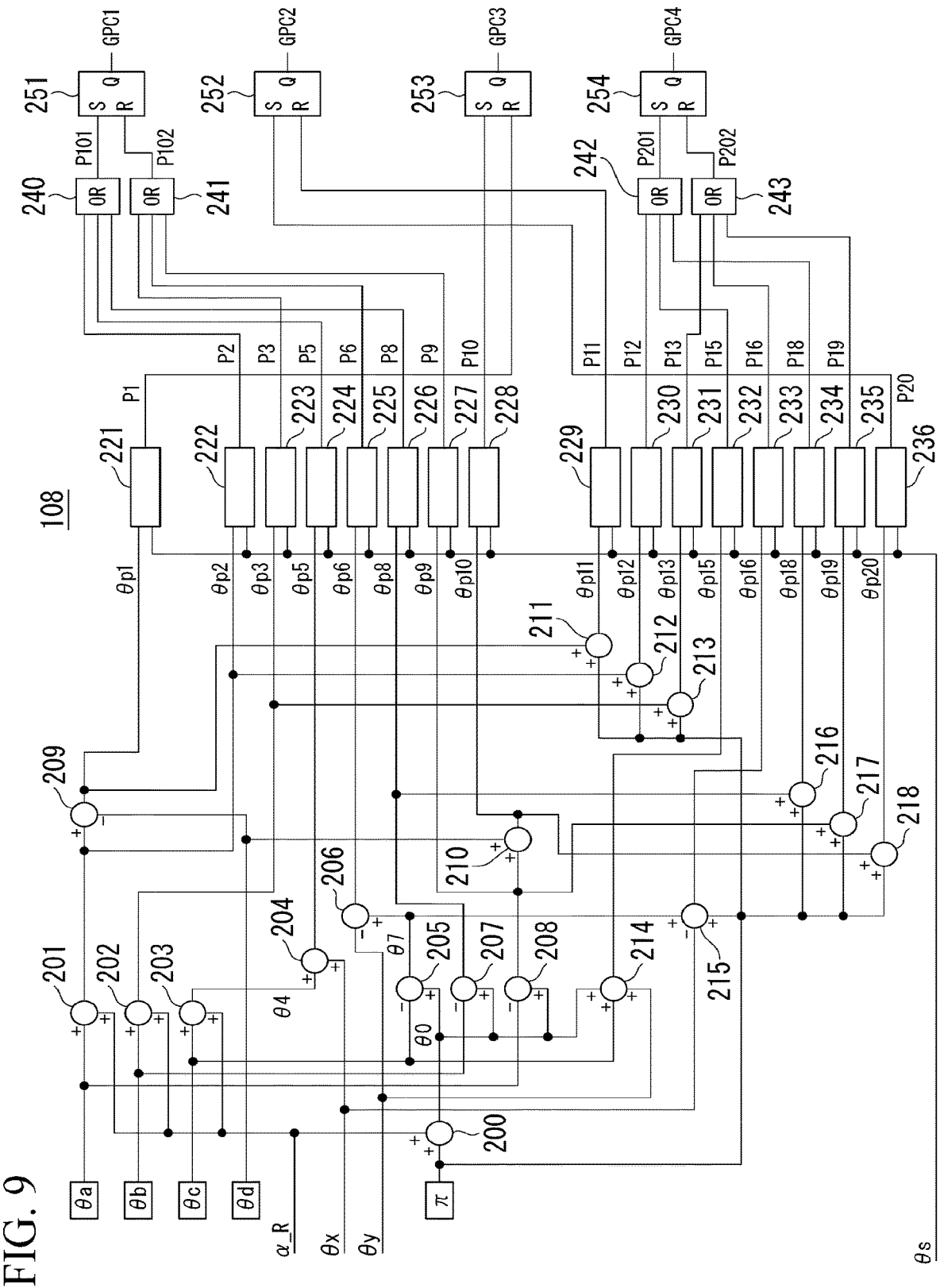
FIG. 9 is a diagram showing an example of a configuration of a fixed pulse pattern generation unit for a first phase of the three-level converter according to the embodiment.

Next, a configuration of the fixed pulse pattern generation unit 108 will be described. FIG. 9 is a diagram showing an example of a configuration of the fixed pulse pattern generation unit for the first phase of the three-level converter according to the embodiment. In FIG. 9, the fixed pulse pattern generation unit 108 includes adders 200 to 204, subtractors 205 to 209, adders 210 to 214, an adder/subtractor 215, adders 216 to 218, timing pulse signal generation circuits 221 to 236, OR circuits 240 to 243, and latch circuits 251 to 254. The phase command α_R is supplied from the converter phase control unit 106. The pulse width correction values θx and θy are supplied from the pulse width correction control unit 107. Phases θa, θb, θc, and θd correspond to rising and falling positions of each pulse of the fixed pulse patterns shown in FIG. 11 to be described below. Data of each of the phases θa, θb, θc, and θd is data for determining the rising and falling positions of each pulse of the fixed pulse patterns. Data of a phase π is data indicating 180 degrees.

The fixed pulse pattern generation unit 108 performs a calculation process using these pieces of data as parameters. It should be noted that these parameters may be set in advance as fixed values inside the fixed pulse pattern generation unit 108 or may be supplied from the outside. It should be noted that although both the switching element SW2 and the switching element SW3 shown in FIG. 2 in the three-level converter may be turned on when a voltage of a zero (neutral point) level is output to the AC side, a case in which one of these switching elements is turned on will be described in the present embodiment, for simplification of description.

The adder 200 adds the phase π to the phase command α_R and outputs an addition result as a phase θ0 to the subtractors 205, 207, and 208 and the adder 214.

The adder 201 adds the phase θa to the phase command α_R and outputs an addition result as a phase θp2 to the subtractor 209, the adder 212, and the timing pulse signal generation circuit 222.

The adder 202 adds the phase θb to the phase command α_R and outputs an addition result as a phase θp3 to the timing pulse signal generation circuit 223 and the adder 213.

The adder 203 adds the phase θc to the phase command α_R and outputs an addition result as a phase θ4 to the adder 204.

The adder 204 adds the phase θ4 from the adder 203 to the pulse width correction value θx and outputs an addition result as a phase θp5 to the timing pulse signal generation circuit 224.

The subtractor 205 subtracts the phase θc from the phase θ0 and outputs a subtraction result as a phase θ7 to the subtractor 206 and the adder/subtractor 215.

The subtractor 206 subtracts the pulse width correction value θy from the phase θ7 and outputs a subtraction result as a phase θp6 to the timing pulse signal generation circuit 225.

The subtractor 207 subtracts the phase θb from the phase θ0 and outputs a subtraction result as a phase θp8 to the timing pulse signal generation circuit 226 and the adder 216.

The subtractor 208 subtracts the phase θa from the phase θ0 and outputs a subtraction result as a phase θp9 to the timing pulse signal generation circuit 227 and the adders 210 and 217.

The subtractor 209 subtracts the phase θd from the phase θp2 and outputs a subtraction result as a phase θp1 to the timing pulse signal generation circuit 221 and the adder 211.

The adder 210 adds the phase θp9 to the phase θd and outputs an addition result as a phase θp10 to the timing pulse signal generation circuit 228 and the adder 218.

The adder 211 adds the phase π to the phase θp1 and outputs an addition result as a phase θp11 to the timing pulse signal generation circuit 229.

The adder 212 adds the phase π to the phase θp2 and outputs an addition result as a phase θp12 to the timing pulse signal generation circuit 230.

The adder 213 adds the phase π to the phase θp3 and outputs an addition result as a phase θp13 to the timing pulse signal generation circuit 231.

The adder 214 adds the phase θ0 and the phase θc to the pulse width correction value θy and outputs an addition result as a phase θp15 to the timing pulse signal generation circuit 232.

The adder/subtractor 215 adds the phase θ7 to the phase π, subtracts the pulse width correction value θx from an addition result, and outputs a subtraction result as θp16 to the timing pulse signal generation circuit 233.

The adder 216 adds the phase π to the phase θp8 and outputs an addition result as a phase θp18 to the timing pulse signal generation circuit 234.

The adder 217 adds the phase π to the phase θp9 and outputs an addition result as a phase θp19 to the timing pulse signal generation circuit 235.

The adder 218 adds the phase π to the phase θp10 and outputs an addition result as a phase θp20 to the timing pulse signal generation circuit 236. Here, the reference phase θs periodically changes in a range from 0 to less than 2π. Also, the phase θa, the phase θb, the phase θc, and the phase θd are set in a range from 0 to less than π/2.

The timing pulse signal generation circuit 221 generates a timing pulse signal P1 from the input phase θp1 and the reference phase θs and outputs the generated timing pulse signal P1 to a reset (R) terminal of the latch circuit 253.

The timing pulse signal generation circuit 222 generates a timing pulse signal P2 from the input phase θp2 and the reference phase θs and outputs the generated timing pulse signal P2 to a first input terminal of the OR circuit 240.

The timing pulse signal generation circuit 223 generates a timing pulse signal P3 from the input phase θp3 and the reference phase θs and outputs the generated timing pulse signal P3 to a first input terminal of the OR circuit 241.

The timing pulse signal generation circuit 224 generates a timing pulse signal P5 from the input phase θp5 and the reference phase θs and outputs the generated timing pulse signal P5 to a second input terminal of the OR circuit 240.

The timing pulse signal generation circuit 225 generates a timing pulse signal P6 from the input phase θp6 and the reference phase θs and outputs the generated timing pulse signal P6 to a second input terminal of the OR circuit 241.

The timing pulse signal generation circuit 226 generates a timing pulse signal P8 from the input phase θp8 and the reference phase θs and outputs the generated timing pulse signal P6 to a third input terminal of the OR circuit 240.

The timing pulse signal generation circuit 227 generates a timing pulse signal P9 from the input phase θp9 and the reference phase θs and outputs the generated timing pulse signal P9 to a third input terminal of the OR circuit 241.

The timing pulse signal generation circuit 228 generates a timing pulse signal P10 from the input phase θp10 and the reference phase θs and outputs the generated timing pulse signal P10 to a set (S) terminal of the latch circuit 253.

The timing pulse signal generation circuit 229 generates a timing pulse signal P11 from the input phase θp11 and the reference phase θs and outputs the generated timing pulse signal P11 to a reset (R) terminal of the latch circuit 252.

The timing pulse signal generation circuit 230 generates a timing pulse signal P12 from the input phase θp12 and the reference phase θs and outputs the generated timing pulse signal P12 to a first input terminal of the OR circuit 242.

The timing pulse signal generation circuit 231 generates a timing pulse signal P13 from the input phase θp13 and the reference phase θs and outputs the generated timing pulse signal P13 to a first input terminal of the OR circuit 243.

The timing pulse signal generation circuit 232 generates a timing pulse signal P15 from the input phase θp15 and the reference phase θs and outputs the generated timing pulse signal P15 to a second input terminal of the OR circuit 242.

The timing pulse signal generation circuit 233 generates a timing pulse signal P16 from the input phase θp16 and the reference phase θs and outputs the generated timing pulse signal P16 to a second input terminal of the OR circuit 243.

The timing pulse signal generation circuit 234 generates a timing pulse signal P18 from the input phase θp18 and the reference phase θs and outputs the generated timing pulse signal P18 to a third input terminal of the OR circuit 242.

The timing pulse signal generation circuit 235 generates a timing pulse signal P19 from the input phase θp19 and the reference phase θs and outputs the generated timing pulse signal P19 to a third input terminal of the OR circuit 243.

The timing pulse signal generation circuit 236 generates a timing pulse signal P20 from the input phase θp20 and the reference phase θs and outputs the generated timing pulse signal P20 to a set (S) terminal of the latch circuit 252.

Each of the OR circuits 240 to 243 calculates a logical sum of the input timing pulse signals.

The OR circuit 240 generates a timing pulse signal P101 from each of the input timing pulse signals P2, P5, and P8 and outputs the generated timing pulse signal P101 to a set (S) terminal of the latch circuit 251.

The OR circuit 241 generates a timing pulse signal P102 from each of the input timing pulse signals P3, P6, and P9 and outputs the generated timing pulse signal P102 to a reset (R) terminal of the latch circuit 251.

The OR circuit 242 generates a timing pulse signal P201 from each of the input timing pulse signals P12, P15, and P18 and outputs the generated timing pulse signal P201 to a set (S) terminal of the latch circuit 254.

The OR circuit 243 generates a timing pulse signal P202 from each of the input timing pulse signals P13, P16, and P19 and outputs the generated timing pulse signal P202 to a reset (R) terminal of the latch circuit 254.

When the level of the timing pulse signal P101 input to the set (S) terminal becomes the "H" level, the latch circuit 251 sets the level of the gate pulse signal GGPC1 output from an output terminal Q to the "H" level and retains the gate pulse signal GPC1 of the "H" level. In contrast, when the level of the timing pulse signal P102 input to the reset (R) terminal becomes the "H" level, the latch circuit 251 sets the level of the gate pulse signal GPC1 output from the output terminal Q to the "L" level and retains the gate pulse signal GPC1 of the "L" level.

When the level of the timing pulse signal P20 input to the set (S) terminal becomes the "H" level, the latch circuit 252 sets the level of the gate pulse signal GPC2 output from an output terminal Q to the "H" level and retains the gate pulse signal GPC2 of the "H" level. In contrast, when the level of the timing pulse signal P11 input to the reset (R) terminal becomes the "H" level, the latch circuit 252 sets the level of the gate pulse signal GPC2 output from the output terminal Q to the "L" level and retains the gate pulse signal GPC2 of the "L" level.

When the level of the timing pulse signal P10 input to the set (S) terminal becomes the "H" level, the latch circuit 253 sets the level of the gate pulse signal GPC3 output from an output terminal Q to the "H" level and retains the gate pulse signal GPC3 of the "H" level. In contrast, when the level of the timing pulse signal P1 input to the reset (R) terminal becomes the "H" level, the latch circuit 253 sets the level of the gate pulse signal GPC3 output from the output terminal Q to the "L" level and retains the gate pulse signal GPC3 of the "L" level.

When the level of the timing pulse signal P201 input to the set (S) terminal becomes the "H" level, the latch circuit 254 sets the level of the gate pulse signal GPC4 output from an output terminal Q to the "H" level and retains the gate pulse signal GPC4 of the "H" level. In contrast, when the level of the timing pulse signal P202 input to the reset (R) terminal becomes the "H" level, the latch circuit 254 sets the level of the gate pulse signal GPC4 output from the output terminal Q to the "L" level and retains the gate pulse signal GPC4 of the "L" level.

As described above, the latch circuit 251 outputs the gate pulse signal GPC1 to a gate drive circuit (not shown) that drives the first switching element SW1 of the first phase of the three-level converter 21.

The latch circuit 252 outputs the gate pulse signal GPC2 to a gate drive circuit (not shown) that drives the second switching element SW2 of the first phase of the three-level converter 21.

The latch circuit 253 outputs the gate pulse signal GPC3 to a gate drive circuit (not shown) that drives the third switching element SW3 of the first phase of the three-level converter 21.

The latch circuit 254 outputs the gate pulse signal GPC4 to a gate drive circuit (not shown) that drives the fourth switching element SW4 of the first phase of the three-level converter 21.

FIG. 9 described above shows an example of a configuration of the fixed pulse pattern generation unit 108 that generates the gate pulse signals GPC1 to GPC4 for the first phase of the three-level converter 21 according to the embodiment. Although not shown in FIG. 9, the fixed pulse pattern generation unit 108 is also provided with a configuration in which the gate pulse signals GPC1 to GPC4 are generated for each of the second phase having a phase shift of 120° and the third phase having a phase shift of 240° with respect to the first phase of the three-level converter 21. In the configuration in which the gate pulse signals for the above-described second phase are generated, the gate pulse signals GPC1 to GPC4 for the second phase are generated by supplying a phase command $\alpha\_R+2\pi/3$ obtained by adding a phase $2\pi/3$ to the supplied phase command $\alpha\_R$. In the configuration in which the gate pulse signals for the above-described third phase are generated, the gate pulse signals GPC1 to GPC4 for the third phase are generated by supplying a phase command $\alpha\_R+4\pi/3$ obtained by adding a phase $4\pi/3$ to the supplied phase command $\alpha\_R$.

Figure 10:
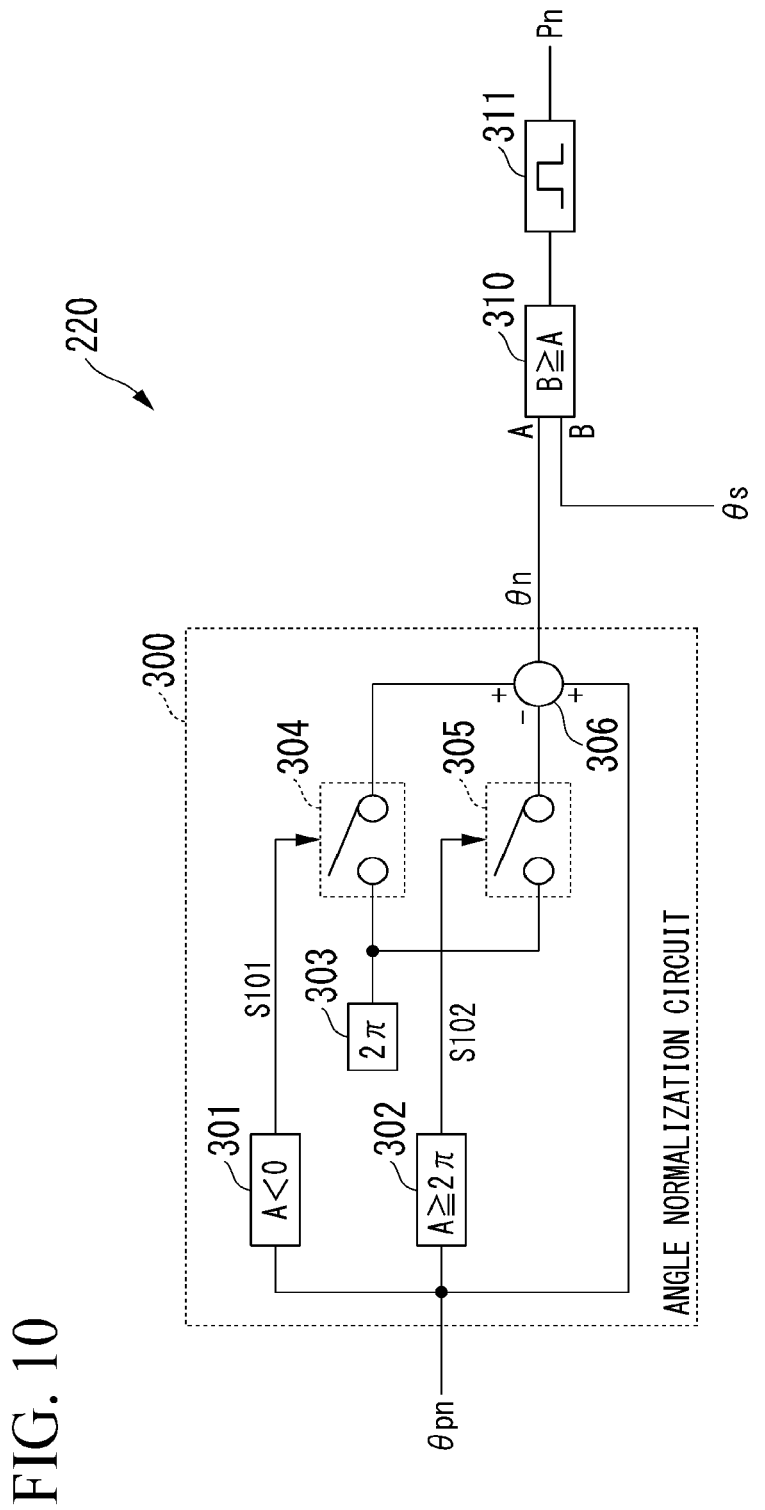
FIG. 10 is a diagram showing an example of a configuration of a timing pulse signal generation circuit according to the embodiment.

Next, a configuration of the timing pulse signal generation circuits 221 to 236 will be described. FIG. 10 is a diagram showing an example of a configuration of a timing pulse signal generation circuit 220 according to the embodiment. The timing pulse signal generation circuit 220 of FIG. 10 is a representative circuit describing examples of configurations of the timing pulse signal generation circuits 221 to 236. In FIG. 10, the timing pulse signal generation circuit 220 includes an angle normalization circuit 300, a comparator 310, and a one-shot pulse circuit 311. Here, a phase $\theta pn$ is the phase $\theta p1$ supplied from the subtractor 209 in the case of the timing pulse signal generation circuit 221, it is the phase $\theta p2$ supplied from the adder 201 in the case of the timing pulse signal generation circuit 222, it is the phase $\theta p3$ supplied from the adder 202 in the case of the timing pulse signal generation circuit 223, it is the phase $\theta p5$ supplied from the adder 204 in the case of the timing pulse signal generation circuit 224, it is the phase $\theta p6$ supplied from the subtractor 206 in the case of the timing pulse signal generation circuit 225, it is the phase $\theta p8$ supplied from the subtractor 207 in the case of the timing pulse signal generation circuit 226, it is the phase $\theta p9$ supplied from the subtractor 208 in the case of the timing pulse signal generation circuit 227, or it is the phase $\theta p10$ supplied from the adder 210 in the case of the timing pulse signal generation circuit 228. The phase $\theta pn$ is the phase $\theta p11$ supplied from the adder 211 in the case of the timing pulse signal generation circuit 229, it is the phase $\theta p12$ supplied from the adder 212 in the case of the timing pulse signal generation circuit 230, it is the phase $\theta p13$ supplied from the adder 213 in the case of the timing pulse signal generation circuit 231, it is the phase $\theta p15$ supplied from the adder 214 in the case of the timing pulse signal generation circuit 232, it is the phase $\theta p16$ supplied from the adder/subtractor 215 in the case of the timing pulse signal generation circuit 233, it is the phase $\theta p18$ supplied from the adder 216 in the case of the timing pulse signal generation circuit 234, it is the phase $\theta p19$ supplied from the adder 217 in the case of the timing pulse signal generation circuit 235, or it is the phase $\theta p20$ supplied from the adder 218 in the case of the timing pulse signal generation circuit 236.

Also, phases $\theta n$ are the phases $\theta 1$ to $\theta 20$ respectively obtained by normalizing $\theta p1$ to $\theta p20$ supplied from the timing pulse signal generation circuits 221 to 236.

A timing pulse signal Pn is the timing pulse signal P1 output to the reset (R) terminal of the latch circuit 253 in the case of the timing pulse signal generation circuit 221, it is the timing pulse signal P2 output to the first input terminal of the OR circuit 240 in the case of the timing pulse signal generation circuit 222, it is the timing pulse signal P3 output to the first input terminal of the OR circuit 241 in the case of the timing pulse signal generation circuit 223, it is the timing pulse signal P5 output to the second input terminal of the OR circuit 240 in the case of the timing pulse signal generation circuit 224, it is the timing pulse signal P6 output to the second input terminal of the OR circuit 241 in the case of the timing pulse signal generation circuit 225, it is the timing pulse signal P8 output to the third input terminal of the OR circuit 240 in the case of the timing pulse signal generation circuit 226, it is the timing pulse signal P9 output to the third input terminal of the OR circuit 241 in the case of the timing pulse signal generation circuit 227, or it is the timing pulse signal P10 output to the set (S) terminal of the latch circuit 253 in the case of the timing pulse signal generation circuit 228. The timing pulse signal Pn is the timing pulse signal P11 output to the reset (R) terminal of the latch circuit 252 in the case of the timing pulse signal generation circuit 229, it is the timing pulse signal P12 output to the first input terminal of the OR circuit 242 in the case of the timing pulse signal generation circuit 230, it is the timing pulse signal P13 output to the first input terminal of the OR circuit 243 in the case of the tuning pulse signal generation circuit 231, it is the timing pulse signal P15 output to the second input terminal of the OR circuit 242 in the case of the timing pulse signal generation circuit 232, it is the timing pulse signal P16 output to the second input terminal of the OR circuit 243 in the case of the timing pulse signal generation circuit 233, it is the timing pulse signal P18 output to the third input terminal of the OR circuit 242 in the case of the timing pulse signal generation circuit 234, it is the timing pulse signal P19 output to the third input terminal of the OR circuit 243 in the case of the timing pulse signal generation circuit 235, or it is the timing pulse signal P20 output to the set (S) terminal of the latch circuit 252 in the case of the timing pulse signal generation circuit 236.

The angle normalization circuit 300 performs a normalization process of converting the phase $\theta pn$ into a phase having a value included in a range of 0 or more and less than $2\pi$ and outputs the phase $\theta n$ as a normalization result to the comparator 310.

The comparator 310 inputs the phase $\theta n$ from the angle normalization circuit 300 and the reference phase $\theta s$ and outputs the "H" level signal to the one-shot pulse circuit 311 when the phase $\theta n$ is less than or equal to the reference phase $\theta s$. When the phase $\theta n$ exceeds the reference phase $\theta s$, the comparator 310 outputs the "L" level signal to the one-shot pulse circuit 311.

The one-shot pulse circuit 311 generates a one-shot pulse having a predetermined width when the level of the signal from the comparator 310 is the "H" level and outputs the generated one-shot pulse as the timing pulse signal Pn. It is assumed that the pulse width of the one-shot signal of the one-shot pulse circuit 311 has a signal width necessary for setting or resetting the latch circuits 251 to 254 shown in FIG. 9.

Next, the angle normalization circuit 300 includes a comparator 301, a comparator 302, a phase setting circuit 303, switches 304 and 305, and an adder/subtractor 306.

When the supplied phase θpn has a negative value, the comparator 301 outputs a control signal S101 of the "H" level to a control terminal of the switch 304. In contrast, when the supplied phase θpn is greater than or equal to the phase "0," the comparator 301 outputs the control signal S101 of the "L" level to the control terminal of the switch 304.

When the supplied phase θpn is greater than or equal to a phase "2π," the comparator 302 outputs a control signal S102 of the "H" level to a control terminal of the switch 305. When the supplied phase θpn is less than the phase "2π," the comparator 302 outputs the control signal S102 of the "L" level to the control terminal of the switch 305.

The phase setting circuit 303 outputs the phase "2π", which has been set in advance, to each of input terminals of the switches 304 and 305.

The switch 304 connects the input terminal and the output terminal when the level of the control signal S101 from the comparator 301 connected to the control terminal becomes the "H" level and outputs the phase "2π" from the phase setting circuit 303 to the adder/subtractor 306. In contrast, the switch 304 outputs a phase "0" to the adder/subtractor 306 when the level of the control signal S101 from the comparator 301 connected to the control terminal is the "L" level.

The switch 305 connects the input terminal and the output terminal when the level of the control signal S102 from the comparator 302 connected to the control terminal becomes the "H" level and outputs the phase "2π" from the phase setting circuit 303 to the adder/subtractor 306. In contrast, the switch 305 outputs a phase "0" to the adder/subtractor 306 when the level of the control signal S102 from the comparator 302 connected to the control terminal is the "L" level.

The adder/subtractor 306 adds the phase output from the switch 304 to the phase θpn, subtracts the phase output from the switch 305, and outputs a calculation result as the θ® n to the comparator 310.

Figure 11:
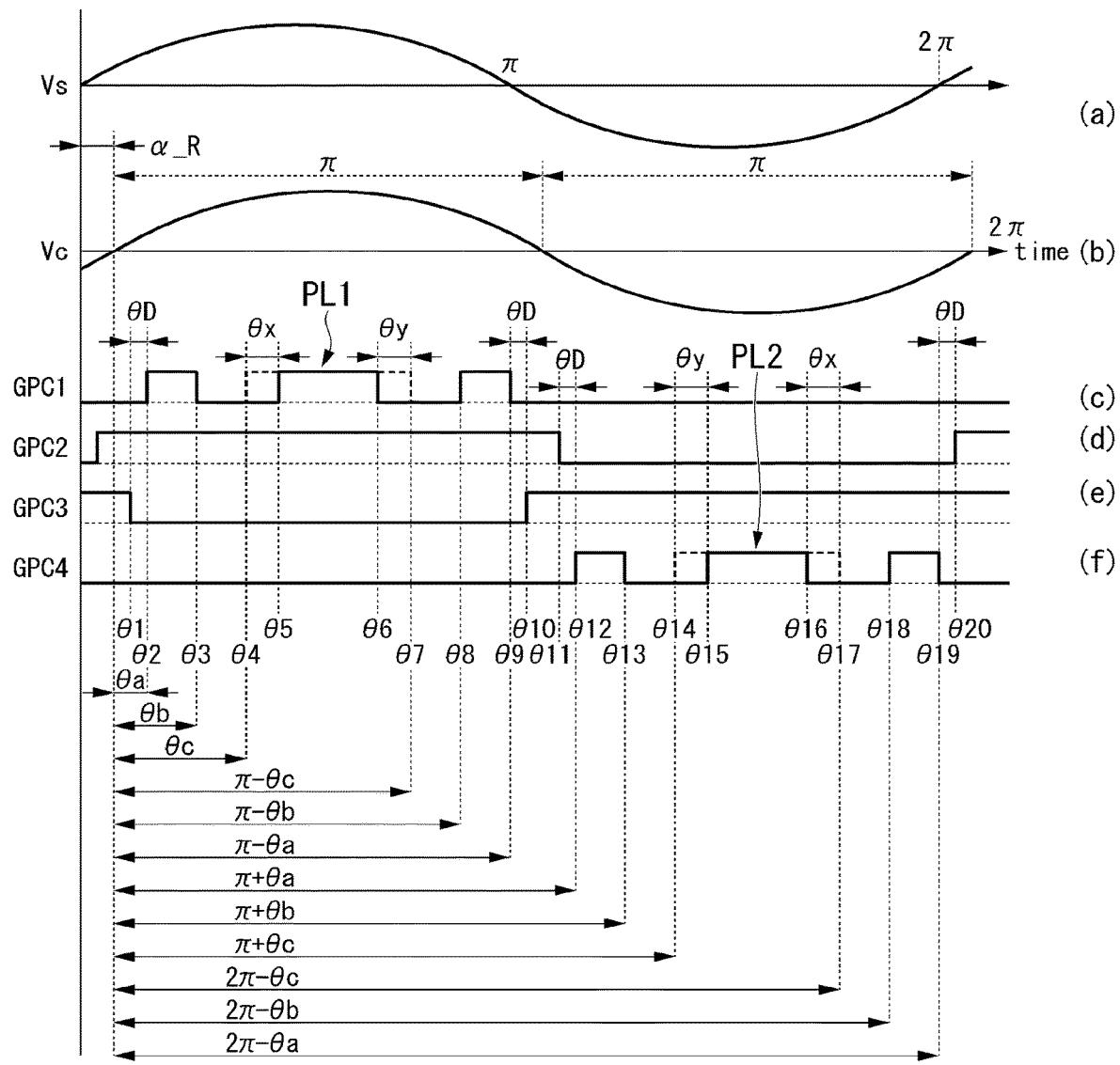
FIG. 11 is a diagram describing control for adjusting the phases of gate pulse signals supplied to the three-level converter and the pulse widths of specific pulses according to the embodiment.

Next, the adjustment of the pulse width of the specific pulse of the fixed pulse pattern will be described with reference to FIGS. 3, 9, 10, and 11. Here, FIG. 11 is a diagram describing control for adjusting the phases of gate pulse signals and the pulse widths of specific pulses supplied to the three-level converter 21 according to the embodiment. A case in which the unbalance suppression control of the three-level converter 21 is performed by delaying the phase by the phase command α_R with respect to the reference phase θs will be described with reference to FIG. 11. The horizontal axis of the graph in FIG. 11, in which each of waveforms of (a) to (f) is shown, represents a range for about one cycle of the basic frequency of the AC and the unit of this horizontal axis is a phase (or time). In (c) to (f) of FIG. 11, θD is a numerical value obtained by converting a dead time tD into a phase. This dead time tD is a time period for preventing another switching element from being turned on before a switching element in the ON state is turned off so that all the first to fourth switching elements SW1 to SW4 of the three-level converter 21 are not turned on at the same time.

(a) of FIG. 11 shows a waveform of the fundamental wave of the first phase of the AC voltage Vs supplied from the transformer 11 to the leg 600. The vertical axis of the graph shown in (a) of FIG. 11 represents a voltage value.

The waveform shown in (a) of FIG. 11 is normalized.

(b) of FIG. 11 shows a waveform of the fundamental wave of the first phase of an AC voltage Vc output by the three-level converter 21. For example, the phases of the fixed pulse patterns are adjusted to the phase in which a predetermined D-axis current flows, and, in the waveform of the AC voltage Vc shown in (b) of FIG. 11, the phase of the fundamental wave Vc of the three-level converter 21 is delayed with respect to the AC voltage Vs. In the three-level converter 21 of the present embodiment, a reactive current is forced to flow through the three-level converter 21 when the unbalance suppression control works.

The operating state of the three-level converter 21 includes an operation based on a normal operation in which no unbalance suppression control is executed and an operation in which the unbalance suppression control is executed. A case in which the three-level converter 21 operates in the normal operation will be described. In this case, the charging voltage of the capacitor 202N and the charging voltage of the capacitor 202P are balanced. The above-described case includes a case in which the charging voltage of the capacitor 202N and the charging voltage of the capacitor 202P are comparable voltages which are close to each other so that the unbalance suppression control is not required. In the above-described case, an absolute difference value |ΔVDiff3| between the charging voltages of the capacitors 202N and 202P is less than the threshold value AAR_VDC_H. At this time, the D-axis current adjustment voltage control unit 109 sets the DC voltage reference correction value CNVPDS_DVR_A to "0" and outputs the set DC voltage reference correction value CNVPDS_DVR_A to the converter phase control unit 106 so that the reactive current is forced to flow regardless of the signal level of the control signal S5 representing the determination result of the operation condition switching circuit 110.

Thereby, the converter phase control unit 106 outputs the phase command α_R to the fixed pulse pattern generation unit 108 so that the difference between the DC voltage feedback VDC_F and the DC voltage reference value CS_V_R that has been set in advance is reduced.

The D-axis current adjustment voltage control unit 109 sets the level of the control signal S1 to the "L" level because the absolute difference value |ΔVDiff3| that is less than or equal to the threshold value AAR_VDC_H is supplied, and outputs the control signal S1 to the pulse width correction control unit 107.

Thereby, the pulse width correction control unit 107 sets the pulse width correction value θx or θy to "0" and outputs the pulse width correction value θx or θy to the fixed pulse pattern generation unit 108.

Because the pulse width correction value θx or θy is supplied as "0," the fixed pulse pattern generation unit 108 generates the gate pulse signals G1 and G2 including specific pulses PL1 and PL2 having pulse widths that have been set in advance on the basis of data of each of the phases θa, θb, θc, θd, and π, which define the positions of the change points of the fixed pulse pattern. That is, the fixed pulse pattern generation unit 108 outputs, to the three-level converter 21, the gate pulse signals G1 and G4 shown in (c) and (f) of FIG. 11, in which each of the pulse widths of the specific pulses PL1 and PL2 is the pulse width of the fixed pulse pattern that has been set in advance, which is not corrected using the pulse width correction values θx or θy. The pulse widths of the specific pulses PL1 and PL2 that are not corrected as described above are pulse widths indicated by broken lines in (c) and (f) of FIG. 11.

First, (c) of FIG. 11 shows the gate pulse signal G1 supplied to the gate of the first switching element SW1 of the leg 600 and the vertical axis thereof represents a voltage. The gate pulse signal G1 in (c) of FIG. 11 is generated in the fixed pulse pattern generation unit 108 as a pattern as follows and is supplied to the gate of the first switching element SW1. That is, the gate pulse signal G1 is generated by the fixed pulse pattern generation unit 108 as a pulse train in which a pulse rises with the timing pulse signal P2 corresponding to the phase θ2 and falls with the timing pulse signal P3 corresponding to the phase θ3, a pulse rises with the timing pulse signal P4 corresponding to the phase θ4 and falls with the timing pulse signal P7 corresponding to the phase θ7, and a pulse rises with the timing pulse signal P8 corresponding to the phase θ8 and falls with the timing pulse signal P9 corresponding to the phase θ9.

Here, the fixed pulse pattern generation unit 108 compares each of the phases θ2, θ3, θ4, θ7, θ8, and θ9 with the reference phase θs and generates the timing pulse signals P2, P3, P5, P6, P8, and P9. Because the pulse width correction value θx is "0," the timing pulse signal P5 is generated by comparing the phase θ4 with the reference phase θs. Because the pulse width correction value θy is "0," the timing pulse signal P6 is generated by comparing the phase θ7 with the reference phase θs. The fixed pulse pattern generation unit 108 generates the gate pulse signal G1 by supplying each of the timing pulse signals P2, P5, and P8 to the set terminal S of the latch circuit 251 and supplying each of the timing pulse signals P3, P6, and P9 to the reset terminal R of the latch circuit 251.

Here, rising with the timing pulse signal Pn means rising in synchronization with a timing when the level of the timing pulse signal Pn changes from the "L" level to the "H" level. Falling with a timing pulse signal Pm means falling in synchronization with a timing when the level of the timing pulse signal Pm changes from the "L" level to the "H" level. The same applies to the description of the rising and falling of each of the following gate pulse signals with each timing pulse signal below.

(d) of FIG. 11 shows the gate pulse signal G2 supplied to the gate of the second switching element SW2 of the leg 600 and the vertical axis thereof represents a voltage. In (d) of FIG. 11, the gate pulse signal G2 rises with the timing pulse signal P20 corresponding to the phase θ20 of a cycle immediately before a cycle in which the fixed pulse pattern generation unit 108 calculates the phases θ1 to θ20 and falls with the timing pulse signal P11 corresponding to the phase θ11. Here, the fixed pulse pattern generation unit 108 compares each of the phases θ20 and θ11 with the reference phase θs and generates the timing pulse signals P20 and P11. The fixed pulse pattern generation unit 108 generates the gate pulse signal G2 by supplying the timing pulse signal P20 to the set terminal S of the latch circuit 252 and supplying the timing pulse signal P11 to the reset terminal R of the latch circuit 252.

(e) of FIG. 11 shows the gate pulse signal G3 supplied to the gate of the third switching element SW3 of the leg 600 and the vertical axis thereof represents a voltage. In the fixed pulse pattern generation unit 108, the gate pulse signal G3 rises with the timing pulse signal P10 corresponding to the phase θ10 and falls in the phase θ1 of the next cycle in (e) of FIG. 11. Here, the fixed pulse pattern generation unit 108 compares each of the phases θ1 and θ10 with the reference phase θs and generates each of the timing pulse signals P1 and P10. The fixed pulse pattern generation unit 108 generates the gate pulse signal G3 by supplying the timing pulse signal P10 to the set terminal S of the latch circuit 253 and supplying the timing pulse signal P1 to the reset terminal R of the latch circuit 253.

(f) of FIG. 11 shows the gate pulse signal G4 supplied to the gate of the fourth switching element SW4 of the leg 600 and the vertical axis thereof represents a voltage. The gate pulse signal G4 of (f) of FIG. 11 is generated in the fixed pulse pattern generation unit 108 as a pattern as follows and is supplied to the gate of the fourth switching element W4. That is, the gate pulse signal G4 is generated by the fixed pulse pattern generation unit 108 as a pulse train in which a pulse rises with the timing pulse signal P12 corresponding to the phase θ12 and falls with the timing pulse signal P13 corresponding to the phase θ13, a pulse rises with the timing pulse signal P14 corresponding to the phase θ14 and falls with the timing pulse signal P17 corresponding to the phase θ17, and a pulse rises with the timing pulse signal P18 corresponding to the phase θ18 and falls with the timing pulse signal P19 corresponding to the phase θ19. Here, the fixed pulse pattern generation unit 108 compares each of the phases θ12, θ13, θ14, θ17, θ18, and θ19 with the reference phase θs and generates the timing pulse signals P12, P13, P15, P16, P18, and P19. Because the pulse width correction value θy is "0," the timing pulse signal P15 is generated by comparing the phase θ14 with the reference phase θs. Because the pulse width correction value θx is "0," the timing pulse signal P16 is generated by comparing the phase θ17 with the reference phase θs. The fixed pulse pattern generation unit 108 generates the gate pulse signal G4 by supplying each of the timing pulse signals P12, P15 and P18 to the set terminal S of the latch circuit 254 and supplying each of the timing pulse signals P13, P16, and P19 to the reset terminal R of the latch circuit 254.

Next, when the three-level converter 21 operates the unbalance suppression control, the converter control unit 100 performs the following control. Because the gate pulse signals G2 and G3 in (d) and (e) of FIG. 11 are the same as those of the above-described case of the normal operation, in which the charging voltage of the capacitor 202N and the charging voltage of the capacitor 202P are comparable, the description thereof will be omitted in the following description.

First, the unbalance suppression control when the charging voltage of the capacitor 202N is higher than the charging voltage of the capacitor 202P, the converter Q-axis current is less than a predetermined value, the level of the D-axis current reference switching signal is the level, and the setting value of the D-axis current is selected to be "+10%" (the lagging power factor) will be described.

When the absolute difference value |VDiff3| between the charging voltages of the capacitors 202N and 202P is greater than or equal to the threshold value AAR_VDC_H, it is necessary to perform charging/discharging control on the capacitors 202N and 202P and perform unbalance suppression control on the charging voltages. The operation condition switching circuit 110 outputs a control signal S5, which represents a result of determining whether or not the converter Q-axis current ICON_DF is so small that a reactive current is required to flow, to the D-axis current adjustment voltage control unit 109.

The situation at this time corresponds to a case in which the absolute difference value |VDiff3| between the charging voltages of the capacitor 202N and the capacitor 202P is greater than or equal to the threshold value AAR_VDC_H and the level of the control signal S5 is the "H" level, and thus a reactive current is required to flow, so that the D-axis current adjustment voltage control unit 109 outputs, to the converter phase control unit 106, a DC voltage reference correction value CNVPDS_DVR_A by which a reactive current of "+10%" is forced to flow in accordance with a setting value.

Thereby, the converter phase control unit 106 outputs the phase command α_R to the fixed pulse pattern generation unit 108 so that the difference between the DC voltage feedback VDC_F and a value obtained by adding the DC voltage reference correction value CNVPDS_DVR_A to the DC voltage reference value CS_V_R that has been set in advance is reduced.

Here, when the setting value of the D-axis current is selected to be "+10%" (the lagging power factor), the DC voltage reference correction value CNVPDS_DVR_A becomes a negative value.

Because the absolute difference value |ΔVDiff3| that exceeds the threshold value AAR_VDC_H is supplied, the D-axis current adjustment voltage control unit 109 sets the level of the control signal S1 to the "H" level and outputs the control signal S1 to the pulse width correction control unit 107.

At this time, the difference value VDiff3 between the charging voltage of the capacitor 202N and the charging voltage of the capacitor 202P is greater than or equal to 0. Because the difference value VDiff3 is greater than or equal to 0, the pulse width correction control unit 107 outputs a pulse width correction value θx other than "0" to the input terminal Q1 of the fixed pulse pattern generation unit 108 and outputs a pulse width correction value By that is "0" to the input terminal Q2 of the fixed pulse pattern generation unit 108.

At this time, in the pulse width correction control unit 107, the input terminal and the output terminal of the switch 119 are electrically connected because the control signal S3 of the "H" level is supplied to the control terminal of the switch 119. Thereby, the pulse width correction value CTROL from the voltage controller 117 is supplied to the first input terminal of the changeover switch 121 and the second input terminal of the changeover switch 122. In contrast, the input terminal and the output terminal of the switch 120 are disconnected because the control signal S4 of the "L" level is supplied to the control terminal of the switch 120. Thereby, the pulse width correction value CTROL_NEG from the −1 multiplication circuit 118 is not supplied to the first input terminal of the changeover switch 122 and the second input terminal of the changeover switch 121.

Because the D-axis current reference switching signal of the "L" level is supplied to the control terminal of each of the changeover switches 121 and 122, the first input terminal and the output terminal of each of the changeover switches 121 and 122 are electrically connected. As a result, the pulse width correction value CTROL is supplied as the pulse width correction value θx to the input terminal Q1 of the fixed pulse pattern generation unit 108.

Here, when the pulse width is not controlled, the specific pulse PL1, which is a specific pulse, rises with the timing pulse signal P5 corresponding to the phase θ4, falls with the timing pulse signal P6 corresponding to the phase θ7, rises with the timing pulse signal P8 corresponding to the phase θ8, and falls with the timing pulse signal P9 corresponding to the phase θ9.

However, when the pulse width correction value θx other than "0" has been supplied from the pulse width correction control unit 107, in order to correct the pulse width of the specific pulse PL1, the fixed pulse pattern generation unit 108 causes the specific pulse PL1 to rise with the timing pulse signal P5 corresponding to the phase θ5 obtained by adjusting the phase θ4 with the pulse width correction value θx to cause a rising phase to be delayed. In this case, a period in which the capacitor 202P is discharged is shortened.

Here, when the pulse width is not controlled, the specific pulse PL2, which is a specific pulse, rises with the timing pulse signal P15 corresponding to the phase θ14, falls with the timing pulse signal P16 corresponding to the phase θ17, rises with the timing pulse signal P18 corresponding to the phase θ18, and falls with the timing pulse signal P19 corresponding to the phase θ19.

However, when the pulse width correction value θx other than "0" has been supplied from the pulse width correction control unit 107, in order to correct the pulse width of the specific pulse PL2, the fixed pulse pattern generation unit 108 causes the specific pulse PL2 to fall with the timing pulse signal P16 corresponding to the phase θ16 obtained by adjusting the phase θ17 with the pulse width correction value θx to cause a falling phase to be advanced. In this case, a period in which the capacitor 202N is charged is shortened.

Here, the gate pulse signal G2 is delayed by the phase θD with respect to the phase θ19, and the second switching element SW2 is turned on when the gate pulse signal G2 of the "H" level is applied and is turned off when the gate pulse signal G2 of the "L" level is applied at a timing earlier than the phase θ12 by the phase θD. The third switching element SW3 is turned off when the gate pulse signal G3 of the "L" level is applied at a timing earlier than the phase θ2 by the phase θD and is turned on when the phase is delayed by the phase θD with respect to the phase θ2 and the gate pulse signal G3 of the "H" level is applied.

When the specific pulse PL1, which is the specific pulse of the gate pulse signal GPC1, is supplied to the gate of the first switching element SW1, the capacitor 202P is discharged during a period in which the current flowing from the AC terminal to the three-level converter 21 is negative and the capacitor 202P is charged during a period in which the current flowing from the AC terminal to the three-level converter 21 is positive.

Likewise, when the specific pulse PL2 of the gate pulse signal GPC4 is applied to the gate of the fourth switching element SW4, the capacitor 202N is discharged during a period in which the current flowing from the AC terminal to the three-level converter 21 is positive and the capacitor 202N is charged during a period in which the current flowing from the AC terminal to the three-level converter 21 is negative.

Thus, in a case in which the three-level converter 21 is operating in the vicinity of a zero power factor of lagging, when the pulse width correction value θx other than "0" has been supplied as described above, the fixed pulse pattern generation unit 108 shortens a period in which the capacitor 202P is discharged by delaying the rising timing of the specific pulse PL1 from the phase θ4 to the phase θ5 by the pulse width correction value θx to delay a timing at which the first switching element SW1 is turned on and shorten the pulse width of the specific pulse PL1. The fixed pulse pattern generation unit 108 increases the phase by which the rising timing of the specific pulse PL1 is delayed as the pulse width correction value θx increases. Thereby, the discharging time of the capacitor 202P is shortened and the charging voltage of the capacitor 202P is raised.

When the pulse width correction value θx other than "0" has been supplied, the fixed pulse pattern generation unit 108 advances the pulse falling timing of the specific pulse PL2 to advance a timing at which control for turning off the fourth switching element SW4 is performed. The fixed pulse pattern generation unit 108 increases a phase by which the falling timing of the specific pulse PL2 is advanced as the numerical value of the pulse width correction value θx increases. Thereby, a charging time period of the capacitor 202N is shortened and the charging voltage of the capacitor 202N is lowered.

Next, the unbalance suppression control when the charging voltage of the capacitor 202P is higher than the charging voltage of the capacitor 202N, the converter Q-axis current is less than a predetermined value, the level of the D-axis current reference switching signal is the "L" level, and the setting value of the D-axis current is selected to be "+10%" (the lagging power factor) will be described.

When the absolute difference value |VDiff3| between the charging voltages of the capacitors 202P and 202N is greater than or equal to the threshold value AAR_VDC_H, it is necessary to perform charging/discharging control on the capacitors 202N and 202P and perform unbalance suppression control on the charging voltages. The operation condition switching circuit 110 outputs a control signal S5, which represents a result of determining whether or not the converter Q-axis current ICON_DF is so small that a reactive current is required to flow, to the D-axis current adjustment voltage control unit 109.

At this time, the D-axis current adjustment voltage control unit 109 outputs, to the converter phase control unit 106, a DC voltage reference correction value CNVPDS_DVR_A by which a reactive current of "+10%" is forced to flow in accordance with a setting value, as in the above-described case in which the charging voltage of the capacitor 202N is higher than the charging voltage of the capacitor 202P.

Thereby, the converter phase control unit 106 outputs the phase command α_R to the fixed pulse pattern generation unit 108 so that the difference between the DC voltage feedback VDC_F and a value obtained by adding the DC voltage reference correction value CNVPDS_DVR_A to the DC voltage reference value CS_V_R that has been set in advance is reduced.

Here, when the setting value of the D-axis current is selected to be "+10%" (the lagging power factor), the DC voltage reference correction value CNVPDS_DVR_A becomes a negative value.

Because the absolute difference value |ΔVDiff3| that exceeds the threshold value AAR_VDC_H is supplied, the D-axis current adjustment voltage control unit 109 sets the control signal S1 to the "H" level and outputs the control signal S1 to the pulse width correction control unit 107.

Here, the difference value VDiff3 between the charging voltage of the capacitor 202N and the charging voltage of the capacitor 202P is less than 0. Thus, the pulse width correction control unit 107 outputs a pulse width correction value θx that is "0" to the input terminal Q1 of the fixed pulse pattern generation unit 108 and outputs a pulse width correction value θy other than "0" to the input terminal Q2 of the fixed pulse pattern generation unit 108.

At this time, in the pulse width correction control unit 107, the input terminal and the output terminal of the switch 119 are disconnected because the control signal S3 of the "L" level is supplied to the control terminal of the switch 119. Thereby, the pulse width correction value CTROL from the voltage controller 117 is not supplied to the first input terminal of the changeover switch 121 and the second input terminal of the changeover switch 122. In contrast, the input terminal and the output terminal of the switch 120 are electrically connected because the control signal S4 of the "L" level is supplied to the control terminal of the switch 120. Thereby, the pulse width correction value CTROL_NEG from the −1 multiplication circuit 118 is supplied to the first input terminal of the changeover switch 122 and the second input terminal of the changeover switch 121.

Because the D-axis current reference switching signal of the "H" level is supplied to the control terminal of each of the changeover switches 121 and 122, the second input terminal and the output terminal of each of the changeover switches 121 and 122 are electrically connected. As a result, the pulse width correction value CTROL_NEG is supplied as the pulse width correction value θy to the input terminal Q2 of the fixed pulse pattern generation unit 108.

Here, when the pulse width correction value θy other than "0" has been supplied from the pulse width correction control unit 107, in order to correct the pulse width of the specific pulse PL1, the fixed pulse pattern generation unit 108 causes the specific pulse PL1 to fall with the timing pulse signal P6 corresponding to the phase θ6 obtained by adjusting the phase θ7 with the pulse width correction value θy to cause a falling phase to be advanced. In this case, a period in which charging is performed from the capacitor 202P is shortened.

When the pulse width correction value θy other than "0" has been supplied from the pulse width correction control unit 107, in order to correct the pulse width of the specific pulse PL2, the fixed pulse pattern generation unit 108 causes the specific pulse PL2 to rise with the timing pulse signal P15 corresponding to the phase θ14 obtained by adjusting the phase θ15 with the pulse width correction value θy to cause a rising phase to be delayed. In this case, a period in which discharging is performed to the capacitor 202N is shortened.

Thus, in (c) of FIG. 11, when the pulse width correction value θy other than "0" has been supplied, the fixed pulse pattern generation unit 108 advances a timing at which the first switching element SW1 is turned off by advancing the falling timing of the specific pulse PL1 from the phase θ7 to the phase θ6 by the pulse width correction value θy to shorten a charging period by shortening the pulse width of the specific pulse PL1. The fixed pulse pattern generation unit 108 increases a phase by which the falling timing of the specific pulse PL1 is advanced as the pulse width correction value θy increases. Thereby, the charging time of the capacitor 202P is shortened and the charging voltage of the capacitor 202P is lowered.

In (f) of FIG. 11, when the pulse width correction value θy other than "0" has been supplied, the fixed pulse pattern generation unit 108 delays the pulse rising timing of the specific pulse PL2 from the phase θ14 to the phase θ15 by the pulse width correction value θy to delay a timing at which control for turning on the fourth switching element SW4 is performed. The fixed pulse pattern generation unit 108 increases a phase by which the rising timing of the specific pulse PL2 is delayed as the numerical value of the pulse width correction value θy increases. Thereby, a discharging time period of the capacitor 202N is shortened and the charging voltage of the capacitor 202N is raised.

With the above-described configuration according to the embodiment, when the charging voltage of the capacitor 202N is higher than the charging voltage of the capacitor 202P and the D-axis current, which is forced to flow through the three-level converter 21, is "+10%," the rising of the specific pulse PL1 of the fixed pulse pattern is delayed, the discharging period of the capacitor 202P is shortened, the charging voltage of the capacitor 202P is raised, the falling of the specific pulse PL2 of the fixed pulse pattern is advanced, the charging period of the capacitor 202N is shortened, and the charging voltage of the capacitor 202N is lowered. As a result, the charging voltage of the capacitor 202N and the charging voltage of the capacitor 202P are balanced and unbalance suppression control on the neutral point voltage can be performed.

Also, when the charging voltage of the capacitor 202P is higher than the charging voltage of the capacitor 202N, the falling of the specific pulse PL1 of the fixed pulse pattern is advanced, the charging period of the capacitor 202P is shortened, the charging voltage of the capacitor 202P is lowered, the rising of the specific pulse PL2 of the fixed pulse pattern is delayed, the discharging period of the capacitor 202N is shortened, and the charging voltage of the capacitor 202N is raised. As a result, the charging voltage of the capacitor 202N and the charging voltage of the capacitor 202P are balanced and unbalance suppression control on the neutral point voltage can be performed.

Next, the unbalance suppression control when the charging voltage of the capacitor 202N is higher than the charging voltage of the capacitor 202P, the converter Q-axis current is less than a predetermined value, the level of the D-axis current reference switching signal is the "L" level, and the setting value of the D-axis current is selected to be "−10%" (the leading power factor) will be described.

When the absolute difference value |VDiff3| between the charging voltages of the capacitors 202N and 202P is greater than or equal to the threshold value AAR_VDC_H, it is necessary to perform charging/discharging control on the capacitors 202N and 202P and perform unbalance suppression control on the charging voltages. The D-axis current adjustment voltage control unit 109 outputs a control signal S5, which represents a result of determining whether or not the converter Q-axis current ICON_DF is so small that a reactive current is required to flow, to the D-axis current adjustment voltage control unit 109.

At this time, the D-axis current adjustment voltage control unit 109 outputs, to the converter phase control unit 106, a DC voltage reference correction value CNVPDS_DVR_A by which a reactive current of "−10%" is forced to flow in accordance with a setting value when the absolute difference value |VDiff3| between the charging voltages of the capacitor 202N and the capacitor 202P is greater than or equal to the threshold value AAR_VDC_H, and the level of the control signal S5 is the "H" level, and thus a reactive current is required to flow.

Thereby, the converter phase control unit 106 outputs the phase command α_R to the fixed pulse pattern generation unit 108 so that the difference between the DC voltage feedback VDC_F and a value obtained by adding the DC voltage reference correction value CNVPDS_DVR_A to the DC voltage reference value CS_V_R that has been set in advance is reduced.

Here, when the setting value of the D-axis current is selected to be "−10%" (the leading power factor), the DC voltage reference correction value CNVPDS_DVR_A becomes a positive value.

Because the absolute difference value |ΔVDiff3| that exceeds the threshold value AAR_VDC_H is supplied, the D-axis current adjustment voltage control unit 109 sets the control signal S1 to the "H" level and outputs the control signal S1 to the pulse width correction control unit 107.

Here, the difference value VDiff3 between the charging voltage of the capacitor 202N and the charging voltage of the capacitor 202P is greater than or equal to 0. Thus, the pulse width correction control unit 107 outputs a pulse width correction value θx that is "0" to the input terminal Q1 of the fixed pulse pattern generation unit 108 and outputs a pulse width correction value θy other than "0" to the input terminal Q2 of the fixed pulse pattern generation unit 108.

At this time, in the pulse width correction control unit 107, the input terminal and the output terminal of the switch 119 are electrically connected because the control signal S3 of the "H" level is supplied to the control terminal of the switch 119. Thereby, the pulse width correction value CTROL from the voltage controller 117 is supplied to the first input terminal of the changeover switch 121 and the second input terminal of the changeover switch 122. In contrast, the input terminal and the output terminal of the switch 120 are disconnected because the control signal S4 of the "L" level is supplied to the control terminal of the switch 120. Thereby, the pulse width correction value CTROL_NEG from the −1 multiplication circuit 118 is not supplied to the first input terminal of the changeover switch 122 and the second input terminal of the changeover switch 121.

Because the D-axis current reference switching signal of the "H" level is supplied to the control terminal of each of the changeover switches 121 and 122, the second input terminal and the output terminal of each of the changeover switches 121 and 122 are electrically connected. As a result, the pulse width correction value CTROL is supplied as the pulse width correction value θy to the input terminal Q2 of the fixed pulse pattern generation unit 108.

Here, when the pulse width correction value θy other than "0" has been supplied from the pulse width correction control unit 107, in order to correct the pulse width of the specific pulse PL1, the fixed pulse pattern generation unit 108 causes the specific pulse PL1 to fall with the timing pulse signal P6 corresponding to the phase θ6 obtained by adjusting the phase θ7 with the pulse width correction value θy to cause a falling phase to be advanced. In this case, a period in which discharging is performed from the capacitor 202P is shortened.

When the pulse width correction value θy other than "0" has been supplied from the pulse width correction control unit 107, in order to correct the pulse width of the specific pulse PL2, the fixed pulse pattern generation unit 108 causes the specific pulse PL2 to rise with the timing pulse signal P15 corresponding to the phase θ14 obtained by adjusting the phase θ15 with the pulse width correction value θy to cause a rising phase to be delayed. In this case, a period in which charging to the capacitor 202N is performed is shortened.

Thus, in (c) of FIG. 11, when the pulse width correction value θy other than "0" has been supplied, the fixed pulse pattern generation unit 108 advances a timing at which the first switching element SW1 is turned off by advancing the falling timing of the specific pulse PL1 from the phase θ7 to the phase θ6 by the pulse width correction value θy to shorten a discharging period by shortening the pulse width of the specific pulse PL1. The fixed pulse pattern generation unit 108 increases a phase by which the falling timing of the specific pulse PL1 is advanced as the pulse width correction value θy increases. Thereby, the discharging time of the capacitor 202P is shortened and the charging voltage of the capacitor 202P is raised.

In (f) of FIG. 11, when the pulse width correction value θy has been supplied, the fixed pulse pattern generation unit 108 causes the pulse rising timing of the specific pulse PL2 to be delayed from the phase θ14 to the phase θ15 by the pulse width correction value θy to cause a timing at which control for turning on the fourth switching element SW4 to be delayed. The fixed pulse pattern generation unit 108 increases a phase by which the rising timing of the specific pulse PL2 is delayed as the numerical value of the pulse width correction value θy increases. Thereby, a charging time period of the capacitor 202N is shortened and the charging voltage of the capacitor 202N is lowered.

Next, the unbalance suppression control when the charging voltage of the capacitor 202P is higher than the charging voltage of the capacitor 202N, the converter Q-axis current is less than a predetermined value, the level of the D-axis current reference switching signal is the "H" level, and the setting value of the D-axis current is selected to be "−10%" (the leading power factor) will be described.

When the absolute difference value |VDiff3| between the charging voltages of the capacitors 202N and 202P is greater than or equal to the threshold value AAR_VDC_H, it is necessary to perform charging/discharging control on the capacitors 202N and 202P and perform unbalance suppression control on the charging voltages. The D-axis current adjustment voltage control unit 109 outputs a control signal S5, which represents a result of determining whether or not the converter Q-axis current ICON_DF is so small that a reactive current is required to flow, to the D-axis current adjustment voltage control unit 109.

At this time, the D-axis current adjustment voltage control unit 109 outputs, to the converter phase control unit 106, a DC voltage reference correction value CNVPDS_DVR_A by which a reactive current of "−10%" is forced to flow in accordance with a setting value, as in the above-described case in which the charging voltage of the capacitor 202N is higher than the charging voltage of the capacitor 202P.

Thereby, the converter phase control unit 106 outputs the phase command α_R to the fixed pulse pattern generation unit 108 so that the difference between the DC voltage feedback VDC_F and a value obtained by adding the DC voltage reference correction value CNVPDS_DVR_A to the DC voltage reference value CS_V_R that has been set in advance is reduced.

Here, when the setting value of the D-axis current is selected to be "−10%" (the leading power factor), the DC voltage reference correction value CNVPDS_DVR_A becomes a positive value.

Because the absolute difference value |ΔVDiff3| that exceeds the threshold value AAR_VDC_H is supplied, the D-axis current adjustment voltage control unit 109 sets the control signal S1 to the "H" level and outputs the control signal S1 to the pulse width correction control unit 107.

Because the absolute difference value |ΔVDiff3| that exceeds the threshold value AAR_VDC_H is supplied, the D-axis current adjustment voltage control unit 109 sets the control signal S1 to the "H" level and outputs the control signal S1 to the pulse width correction control unit 107.

Here, the difference value VDiff3 between the charging voltage of the capacitor 202N and the charging voltage of the capacitor 202P is less than 0. Thus, the pulse width correction control unit 107 outputs a pulse width correction value θx other than "0" to the input terminal Q1 of the fixed pulse pattern generation unit 108 and outputs a pulse width correction value θy that is "0" to the input terminal Q2 of the fixed pulse pattern generation unit 108.

At this time, in the pulse width correction control unit 107, the input terminal and the output terminal of the switch 119 are electrically disconnected because the control signal S3 of the "L" level is supplied to the control terminal of the switch 119. Thereby, the pulse width correction value CTROL from the voltage controller 117 is not supplied to the first input terminal of the changeover switch 121 and the second input terminal of the changeover switch 122. In contrast, the input terminal and the output terminal of the switch 120 are electrically connected because the control signal S4 of the "H" level is supplied to the control terminal of the switch 120. Thereby, the pulse width correction value CTROL_NEG from the −1 multiplication circuit 118 is supplied to the first input terminal of the changeover switch 122 and the second input terminal of the changeover switch 121.

Because the D-axis current reference switching signal of the "H" level is supplied to the control terminal of each of the changeover switches 121 and 122, the second input terminal and the output terminal of each of the changeover switches 121 and 122 are electrically connected. As a result, the pulse width correction value CTROL_NEG is supplied as the pulse width correction value θx to the input terminal Q1 of the fixed pulse pattern generation unit 108.

As described above, when the pulse width correction value θx other than "0" has been supplied from the pulse width correction control unit 107, the fixed pulse pattern generation unit 108 causes the rising timing of the specific pulse PL1 to be delayed from the phase θ4 to the phase θ5 by the pulse width correction value θx to cause a timing at which the first switching element SW1 is turned off to be delayed and shorten the charging period by shortening the pulse width of the specific pulse PL1. The fixed pulse pattern generation unit 108 increases a phase by which the rising timing of the specific pulse PL1 is delayed as the pulse width correction value θx increases. Thereby, the charging time period of the capacitor 202P is shortened and the charging voltage of the capacitor 202P is lowered.

When the pulse width correction value θx other than "0" has been supplied from the pulse width correction control unit 107, the fixed pulse pattern generation unit 108 advances the pulse falling timing of the specific pulse PL2 from the phase θ17 to the phase θ16 by the pulse width correction value θx to advance a timing at which control for turning on the fourth switching element SW4 is performed. The fixed pulse pattern generation unit 108 increases a phase by which the falling timing of the specific pulse PL2 is advanced as the numerical value of the pulse width correction value θx increases. Thereby, the discharging time period of the capacitor 202N is shortened and the charging voltage of the capacitor 202N is raised.

With the above-described configuration according to the embodiment, when the charging voltage of the capacitor 202N is higher than the charging voltage of the capacitor 202P and the D-axis current to flow is "−10%," the rising of the specific pulse PL1 of the fixed pulse pattern is delayed, the charging period of the capacitor 202P is shortened, the charging voltage of the capacitor 202P is lowered, the falling of the specific pulse PL2 of the fixed pulse pattern is advanced, the discharging period of the capacitor 202N is shortened, and the charging voltage of the capacitor 202N is raised. As a result, the charging voltage of the capacitor 202N and the charging voltage of the capacitor 202P are balanced and unbalance suppression control on the neutral point voltage can be performed.

With the embodiment described above, even if an active current flowing through a three-level converter is small in a configuration in which the three-level converter is controlled with the fixed pulse pattern, it is possible to adjust the pulse width of a specific pulse of a fixed pulse pattern so as to correspond to a charging/discharging operation for each of the P- and N-side capacitors by forcing a predetermined reactive current to flow through the three-level converter and it is possible to easily perform the unbalance suppression control of the neutral point by causing the P- and N-side capacitors to perform charging/discharging operations so that the difference between the charging voltages of the P- and N-side capacitors approaches 0.

Also, a three-level converter according to a comparative example that adopts fixed pulse pattern control includes a three-level converter that performs unbalance suppression control on a neutral point voltage in a supplied DC voltage only on a three-level inverter side. In such a three-level converter according to the comparative example, the phase of the fixed pulse pattern can be changed, but it may be not possible to individually control each of charging currents and discharging currents of a P-side capacitor and an N-side capacitor connected to the three-level converter in order to eliminate the unbalance because a pulse width with which switching control for switching elements of the three-level converter according to the comparative example is performed is fixed.

Here, although there is no problem when the three-phase AC of the power supply supplied to the three-level converter according to the comparative example described above is balanced, the neutral point voltage may change when unbalance or harmonics are present. When the load connected to the three-level inverter is light or is not operating, when the load is not connected to the three-level inverter, or the like, it is difficult for the three-level inverter to perform the unbalance suppression control on the neutral point voltage because the amount of current flowing through the three-level inverter is insufficient for performing the control.

However, with the above-described configuration according to the embodiment, even if the three-level inverter is not in the operating state and the load on the three-level inverter is small, it is possible to provide a three-level converter capable of easily controlling the voltage at a neutral point by controlling the pulse width of the specific pulse of the fixed pulse pattern and individually controlling each of charging currents and discharging currents of the P-side capacitor and the N-side capacitor.

In the above-described embodiment, the unbalance suppression control of the three-level converter 21 based on the AC voltage Vc delayed by the phase command α_R with respect to the reference phase θs has been described as an example. However, the unbalance suppression control of the three-level converter 21 may be configured to be performed using the AC voltage Vc of which phase is advanced by the phase command α_R with respect to the reference phase θs.

In the above-described embodiment, a description that only one three-level inverter 22 is connected to the three-level converter 21 has been given.

It should be noted that a configuration in which a plurality of three-level inverters are connected in parallel to the three-level converter 21 may be used. In this case, the inverter Q-axis current IINV_QF of each of the three-level inverters is obtained, an average value or a total value of the inverter Q-axis currents IINV_QF of all the three-level inverters, or a maximum value of the inverter Q-axis currents IINV_QF of all the three-level inverters is used as the inverter Q-axis current IINV_QF to be supplied to the operation condition switching circuit 110.

While an embodiment of the present invention has been described, this embodiment has been presented by way of example and is not intended to limit the scope of the invention. These embodiments can be implemented in various forms, and various omissions, substitutions, and modifications can be made without departing from the substance of the invention. These embodiments and modifications thereof are included in the scope and substance of the invention and are included in the invention described in the claims and the equivalent scope thereof.

The control unit 550 according to the embodiment may be, for example, a device used in the following three-level power conversion device. The control unit 550 (the device) is a device for performing the above-described unbalance suppression control on the basis of the converter input current ICON_F supplied from the input current detector 12, the AC voltage Vs supplied from the power supply voltage detector 13, the P-side DC voltage VDCP_F supplied from the DC voltage measuring instrument 201P, the N-side DC voltage VDCN_F supplied from the DC voltage measuring instrument 201N, the inverter output current IINV_F supplied from the output current detector 31, and the rotor rotation angle θM supplied from the output current detector 31. The control unit 550 is provided with, for example, the converter control unit 100 and the inverter control unit 150.

It should be noted that the control unit 550 may cause the three-level inverter 22 to perform control for reducing the difference between the charging voltages of the capacitors 202P and 202N when a predetermined condition is satisfied. When the control unit 550 causes the three-level inverter 22 to perform the above-described control, control of the pulse width of the pulse of the fixed pulse pattern by the three-level converter 21, that is, the above-mentioned unbalance suppression control is not performed.

The above-described predetermined condition includes the following conditions:
an active current of an output current output from at least one three-level inverter 22 or a maximum value of the active current is greater than or equal to a threshold value,
at least one of a sum of active currents of output currents output from a plurality of three-level inverters 22, an average value of the active currents of the output currents, and a maximum value of the active currents of the output currents is greater than or equal to a threshold value, and
one of a value related to the current value of a DC current output from the three-level converter 21 and a value related to an active current of an input current input to the three-level converter 21 is greater than or equal to a threshold value.

Figure 12:
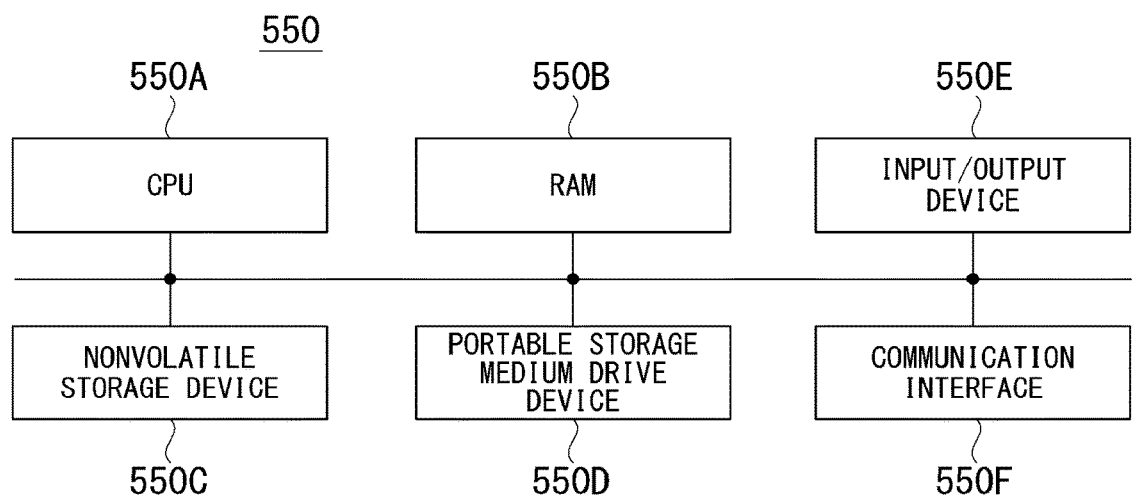
FIG. 12 is a diagram showing an example of a configuration of hardware of a control unit according to the embodiment.

FIG. 12 is a diagram showing an example of a configuration of hardware of the control unit 550 according to the embodiment. The control unit 550 is provided with, for example, a CPU 550A, a random-access memory (RAM) 550B, a nonvolatile storage device 550C, a portable storage medium drive device 550D, an input/output device 550E, and a communication interface 550F. The control unit 550 may include any processor such as a GPU instead of the CPU 550A. Some of the above-described components shown in FIG. 12 may be omitted.

The CPU 550A performs various processes to be performed in the above-described unbalance suppression control by loading a program stored in the nonvolatile storage device 550C or a program stored in a portable storage medium mounted in the portable storage medium drive device 550D into the RAM 550B and executing the program. The RAM 550B is used as a working area by the CPU 550A. The nonvolatile storage device 550C is, for example, an HDD, a flash memory, a ROM, or the like. A portable storage medium such as a DVD, a compact disc (CD), or an SD (registered trademark) card is mounted in the portable storage medium drive device 550D. The input/output device 550E includes, for example, a keyboard, a mouse, a touch panel, a display device, and the like. The communication interface 550F functions as an interface when the control unit 550 communicates with another device.

With at least one embodiment described above, a three-level power conversion device includes a three-level converter, a first capacitor, a second capacitor, and a control unit. The three-level converter includes a positive electrode terminal, a neutral point terminal, and a negative electrode terminal as output terminals. The first capacitor is connected between the positive electrode terminal and the neutral point terminal. The second capacitor is connected between the neutral point terminal and the negative electrode terminal. The control unit can cause a switching element of the three-level converter to be operated using a gate pulse signal generated by each pulse of a fixed pulse pattern, control a pulse width of at least one pulse included in the fixed pulse pattern, and control charging and discharging of the first capacitor and the second capacitor when a voltage difference between a charging voltage of the first capacitor and a charging voltage of the second capacitor is greater than or equal to a threshold value that has been set in advance. Thereby, it is possible to charge and discharge each of the first capacitor and the second capacitor so that the difference between the charging voltages of the first capacitor and the second capacitor approaches 0 and to execute unbalance suppression control on voltages of the first capacitor and the second capacitor, which form a pair of capacitors.

Also, in each of the above-described embodiments, the unbalance suppression control on the voltages of the pair of the first capacitor and the second capacitor connected to the output terminal of the I-type three-level converter has been described.

However, as in the above-described I-type three-level converter, a T-type three-level converter can also perform unbalance suppression control on charging voltages of a pair of capacitors connected to an output terminal by controlling the pulse width of a specific pulse in a specific gate pulse signal GPC to be supplied to a gate of each switching element that controls the lengths of charging and discharging periods of the pair of capacitors.

DESCRIPTION OF REFERENCE SIGNS

1 Three-level power conversion device
10 Three-phase AC power supply
11 Transformer
13 Power supply voltage detector
12 Input current detector
21 Three-level converter
22 Three-level inverter
31 Output current detector
32 Rotation angle detector
100 Converter control unit
101 AC voltage phase detector
102 Average value calculation circuit
104, 162 DQ converter
105 Inverter Q-axis current generation unit
106 Converter phase control unit
107 Pulse width correction control unit
108 Fixed pulse pattern generation unit
109 D-axis current adjustment voltage control unit (instruction unit)
110 Operation condition switching circuit (switching unit)
115 Phase controller
116, 142 First-order lag circuit
118 −1 multiplication circuit
119, 120, 304, 305 Switch
121, 122, 140, 141, 155 Changeover switch
130, 151, 153 Absolute value circuit
132, 134 On-delay circuit
135, 251, 252, 253, 254 Latch circuit
137, 138, 139 D-axis current setting circuit
150 Inverter control unit
161 Electrical angle conversion unit
201N, 201P DC voltage measuring instrument
202N Capacitor (first capacitor)
202P Capacitor (second capacitor)
221, 222, 223, 224, 225 226, 227, 228, 229, 230, 231, 232, 233, 234, 235, 236 Timing pulse signal generation circuit
500 Three-phase AC motor
550 Control unit
SW1 First switching element
SW2 Second switching element
SW3 Third switching element
SW4 Fourth switching element
TN Negative electrode potential portion
TP Positive electrode potential portion

The invention claimed is:

1. A three-level power conversion device comprising:
a three-level converter comprising a positive electrode terminal, a neutral point terminal, and a negative electrode terminal as output terminals and converting an AC voltage into a DC voltage;
a first capacitor connected between the positive electrode terminal and the neutral point terminal;
a second capacitor connected between the neutral point terminal and the negative electrode terminal; and
a control circuitry that causes a switching element of the three-level converter to be operated using a gate pulse signal generated by each pulse of a fixed pulse pattern and, when a voltage difference between a charging voltage of the first capacitor and a charging voltage of the second capacitor is greater than or equal to a threshold value that has been set in advance, controls a pulse width of at least one pulse included in the gate pulse signal and controls charging and discharging of the first capacitor and the second capacitor,
wherein when an active current of an input current of the three-level converter is less than a second threshold value, the control circuitry outputs, to the three-level converter, a control instruction for causing a predetermined reactive current that is delayed or advanced with respect to the AC voltage supplied to the three-level converter to flow.

2. The three-level power conversion device according to claim 1, wherein, for the pulse of which pulse width is controlled, the control circuitry causes a width of a region that defines a period in which a capacitor with a higher charging voltage between the first capacitor and the second capacitor is charged to be reduced and causes a width of a region that defines a period in which a capacitor with a lower charging voltage between the first capacitor and the second capacitor is discharged to be reduced.

3. The three-level power conversion device according to claim 2,
wherein the three-level converter comprises:
a positive electrode potential portion connected to the positive electrode terminal;
a negative electrode potential portion connected to the negative electrode terminal; and
a first switching element, a second switching element, a third switching element, and a fourth switching element provided between the positive electrode potential portion and the negative electrode potential portion,
wherein at least the first switching element and the fourth switching element are connected in series between the positive electrode potential portion and the negative electrode potential portion, the first switching element controls charging and discharging periods of the first capacitor, and the fourth switching element controls charging and discharging periods of the second capacitor, and the control circuitry reduces the pulse width so that a conduction width of the first switching element or a conduction width of the fourth switching element is decreased.

4. The three-level power conversion device according to claim 3, wherein the pulse of which pulse width is controlled in the gate pulse signal is a pulse that maximizes conduction widths of the first switching element and the fourth switching element among a plurality of pulses of the gate pulse signal.

5. The three-level power conversion device according to claim 1, further comprising at least one three-level inverter,
wherein when an active current of an output current output from the at least one three-level inverter is greater than or equal to a third threshold value, the control circuitry causes the at least one three-level inverter to perform control for reducing the difference between the charging voltage of the first capacitor and the charging voltage of the second capacitor and does not control the pulse width of the pulse in the gate pulse signal.

6. The three-level power conversion device according to claim 1, further comprising at least one three-level inverter,
wherein when a sum of active currents of output currents of the at least one three-level inverter is greater than or equal to a third threshold value, the control circuitry causes the at least one three-level inverter to perform control for reducing the difference between the charging voltage of the first capacitor and the charging voltage of the second capacitor and does not control the pulse width of the pulse in the gate pulse signal.

7. The three-level power conversion device according to claim 1, further comprising at least one three-level inverter,
wherein when a maximum value of active currents of output currents of the at least one three-level inverter is greater than or equal to a third threshold value, the control circuitry causes the at least one three-level inverter to perform control for reducing the difference between the charging voltage of the first capacitor and the charging voltage of the second capacitor and does not control the pulse width of the pulse in the gate pulse signal.

8. The three-level power conversion device according to claim 1, further comprising at least one three-level inverter,
wherein when a value related to a current value of a DC current output by the three-level converter is greater than or equal to a third threshold value, the control circuitry causes the at least one three-level inverter to perform control for reducing the difference between the charging voltage of the first capacitor and the charging voltage of the second capacitor and does not control the pulse width of the pulse in the gate pulse signal.

9. The three-level power conversion device according to claim 1, further comprising at least one three-level inverter,
wherein when an active current of an input current input to the at least one three-level inverter is greater than or equal to a third threshold value, the control circuitry causes the at least one three-level inverter to perform control for reducing the difference between the charging voltage of the first capacitor and the charging voltage of the second capacitor and does not control the pulse width of the pulse in the gate pulse signal.

10. The three-level power conversion device according to claim 1, further comprising at least one three-level inverter,
wherein when an active current of an output current of the at least one three-level inverter is less than a third threshold value, the control circuitry outputs, to the three-level converter, the control instruction for causing the predetermined reactive current that is delayed or advanced with respect to the AC voltage supplied to the three-level converter to flow and performs charging or discharging of the first capacitor and charging or discharging of the second capacitor by changing the pulse width.

11. The three-level power conversion device according to claim 10, wherein the control circuitry corrects a DC voltage reference value set as a control target for charging voltages with which the first capacitor and the second capacitor are charged to correspond to the control instruction for causing the predetermined reactive current to flow to generate a corrected DC voltage reference value, and controls a basic phase of the AC voltage of the three-level converter so that the charging voltage of the first capacitor and the charging voltage of the second capacitor approach the corrected DC voltage reference value.

12. The three-level power conversion device according to claim 1, further comprising at least one three-level inverter,
wherein when a value related to a current value of a DC current output by the three-level converter or a DC current input to the at least one three-level inverter is less than a third threshold value, the control circuitry outputs, to the three-level converter, the control instruction for causing the predetermined reactive current that is delayed or advanced with respect to the AC voltage supplied to the three-level converter to flow and performs charging or discharging of the first capacitor and charging or discharging of the second capacitor by changing the pulse width.

13. The three-level power conversion device according to claim 12, wherein the control circuitry further:
switches between the predetermined reactive current that is delayed and the predetermined reactive current that is advanced, and
outputs the control instruction for causing the predetermined reactive current that has been selected to flow through the three-level converter.

14. The three-level power conversion device according to claim 1, wherein when the active current of the input current of the three-level converter is less than the second threshold value for the active current, the control circuitry further performs charging or discharging of the first capacitor and charging or discharging of the second capacitor by changing the pulse width.

15. The three-level power conversion device according to claim 14, wherein the control circuitry:
switches between the predetermined reactive current that is delayed and the predetermined reactive current that is advanced and
outputs the control instruction for causing the predetermined reactive current that has been selected to flow through the three-level converter.

16. The three-level power conversion device according to claim 1, wherein the control circuitry lengthens a time period from a time when the voltage difference between the charging voltage of the first capacitor and the charging voltage of the second capacitor becomes less than a third threshold value for the voltage difference to a time when control for reducing the voltage difference stops with respect to a time period from a time when the voltage difference becomes greater than or equal to the threshold value for the voltage difference to a time when the control for reducing the voltage difference starts.

17. A control method of a three-level power conversion device comprising a three-level converter including a positive electrode terminal, a neutral point terminal, and a negative electrode terminal as output terminals and converting an AC voltage to a DC voltage, a first capacitor connected between the positive electrode terminal and the neutral point terminal, and a second capacitor connected between the neutral point terminal and the negative electrode terminal, the control method comprising:

causing a switching element of the three-level converter to be operated using a gate pulse signal generated by each pulse of a fixed pulse pattern and, when a voltage difference between a charging voltage of the first capacitor and a charging voltage of the second capacitor is greater than or equal to a threshold value that has been set in advance, controlling a pulse width of at least one gate pulse included in the gate pulse signal and controlling charging and discharging of the first capacitor and the second capacitor; and wherein when an active current of an input current of the three-level converter is less than a second threshold value, outputting, to the three-level converter, a control instruction for causing a predetermined reactive current that is delayed or advanced with respect to the AC voltage supplied to the three-level converter to flow.

18. A non-transitory storage medium that is readable by a computer and stores a computer program used in control of a three-level power conversion device that comprises a three-level converter including a positive electrode terminal, a neutral point terminal, and a negative electrode terminal as output terminals and converting an AC voltage into a DC voltage, a first capacitor connected between the positive electrode terminal and the neutral point terminal, and a second capacitor connected between the neutral point terminal and the negative electrode terminal, the computer program when executed by the computer causing the computer to:

cause a switching element of the three-level converter to be operated using a gate pulse signal generated by each pulse of a fixed pulse pattern and, when a voltage difference between a charging voltage of the first capacitor and a charging voltage of the second capacitor is greater than or equal to a threshold value that has been set in advance, control a pulse width of at least one pulse included in the gate pulse signal and control charging and discharging of the first capacitor and the second capacitor; and when an active current of an input current of the three-level converter is less than a second threshold value, output, to the three-level converter, a control instruction for causing a predetermined reactive current that is delayed or advanced with respect to the AC voltage supplied to the three-level converter to flow.

* * * * *